(12) United States Patent
Shapira

(10) Patent No.: US 12,216,713 B1
(45) Date of Patent: Feb. 4, 2025

(54) ACCESSING DATA FROM A DATABASE

(71) Applicant: Humane, Inc., San Francisco, CA (US)

(72) Inventor: Barry Shapira, San Francisco, CA (US)

(73) Assignee: Humane, Inc., San Francisco, CA (US)

( * ) Notice: Subject to any disclaimer, the term of this patent is extended or adjusted under 35 U.S.C. 154(b) by 0 days.

(21) Appl. No.: 18/363,688

(22) Filed: Aug. 1, 2023

Related U.S. Application Data

(60) Provisional application No. 63/394,592, filed on Aug. 2, 2022.

(51) Int. Cl.
*G06F 16/00* (2019.01)
*G06F 16/9032* (2019.01)
*G06N 20/00* (2019.01)

(52) U.S. Cl.
CPC .. *G06F 16/90332* (2019.01); *G06F 16/90324* (2019.01); *G06N 20/00* (2019.01)

(58) Field of Classification Search
None
See application file for complete search history.

(56) References Cited

U.S. PATENT DOCUMENTS

| | | | | |
|---|---|---|---|---|
| 9,129,606 | B2 * | 9/2015 | Chang | G06F 16/9024 |
| 9,536,522 | B1 * | 1/2017 | Hall | G06F 16/3344 |
| 11,269,898 | B1 * | 3/2022 | Salaka | G06N 20/20 |
| 2006/0047617 | A1 * | 3/2006 | Bacioiu | G06N 3/08 |
| | | | | 717/124 |
| 2015/0317318 | A1 * | 11/2015 | Hadzhiyski | G06F 16/907 |
| | | | | 707/752 |
| 2018/0004752 | A1 * | 1/2018 | Deng | G06F 16/3347 |
| 2019/0102693 | A1 * | 4/2019 | Yates | G06N 20/00 |
| 2020/0050949 | A1 * | 2/2020 | Sundararaman | G06F 40/284 |
| 2020/0151566 | A1 * | 5/2020 | Mars | G06N 20/20 |
| 2021/0182283 | A1 * | 6/2021 | Carney | G06F 16/248 |
| 2021/0279235 | A1 * | 9/2021 | He | G06F 16/243 |

(Continued)

OTHER PUBLICATIONS

Kanel, "Sixth Sense Technology," Thesis for the Bachelor Degree of Engineering in Information and Technology, Centria University of Applied Sciences, May 2014, 46 pages.

(Continued)

*Primary Examiner* — Hasanul Mobin
(74) *Attorney, Agent, or Firm* — Fish & Richardson P.C.

(57) ABSTRACT

Systems, methods, devices and non-transitory, computer-readable storage mediums are disclosed for a wearable multimedia device and cloud computing platform with an application ecosystem for processing multimedia data captured by the wearable multimedia device. In an embodiment, a method for using a machine learning model to provide data corresponding to a query comprises receiving a query for data stored in one or more databases. A prompt file is determined for the query. The prompt file and the query are provided as input for a machine learning model configured to generate a prediction for the query. Training the machine learning model can include updating network parameters in the machine learning model based on the prompt file. The prediction generated for the query is received. The prediction comprises a predicted database query corresponding to the query, and a level of accuracy is determined for the predicted database query.

20 Claims, 16 Drawing Sheets

(56) References Cited

U.S. PATENT DOCUMENTS

| | | | | |
|---|---|---|---|---|
| 2021/0326346 | A1* | 10/2021 | Rivlin | G06N 3/045 |
| 2022/0005055 | A1* | 1/2022 | Wang | G06Q 10/06315 |
| 2022/0101094 | A1* | 3/2022 | Kumar | G06N 3/042 |
| 2022/0284613 | A1* | 9/2022 | Yin | G06T 7/30 |
| 2022/0414168 | A1* | 12/2022 | Gomes Pereira | G06F 16/9035 |

OTHER PUBLICATIONS

Mann et al., "Telepointer: Hands-Free Completely Self Contained Wearable Visual Augmented Reality without Headwear and without any Infrastructural Reliance", IEEE Fourth International Symposium on Wearable Computers, Atlanta, GA, USA, Oct. 16-17, 2000, 4 pages.

Mann, "Wearable Computing: A First Step Toward Personal Imaging," IEEE Computer, Feb. 1997, 30(2):25-32.

Mann, "Wearable, tetherless computer-mediated reality," American Association of Artificial Intelligence Technical Report, Feb. 1996, 62-69, 8 pages.

Metavision.com [online], "Sensularity with a Sixth Sense," available on or before Apr. 7, 2015, via Internet Archive: Wayback Machine URL <http://web.archive.org/web/20170901072037/https://blog.metavision.com/professor-steve-mann-society-of-sensularity-with-a-sixth-sense/> retrieved on Apr. 25, 2023, URL <https://blog.metavision.com/professor-steve-mann-society-of-sensularity-with-a-sixth-sense/>, 4 pages.

Mistry et al., "WUW—wear Ur world: a wearable gestural interface", Proceedings of the 27th international conference Extended Abstracts on Human Factors in Computing Systems—CHI EA '09, Boston, MA, USA, Apr. 4-9, 2009, 6 pages.

Shetty et al., "Sixth Sense Technology," International Journal of Science and Research, Dec. 2014, 3(12):1068-1073.

* cited by examiner

| Streams | Users | Userdevices | Devices |
|---|---|---|---|
| streamid | userid | userid | deviceid |
| deviceid | deviceid | deviceid | started |
| start | email | | state |
| end | fname | | modified |
| lat | lname | | created |
| lon | | | |
| attributes | | | |
| entities | | | |

| ProcessingResults | Entities | EntityTypes | EntityAssociations |
|---|---|---|---|
| streamid | entityID | person | entity 1 |
| ai | userid | place | entity 2 |
| result | entityName | thing | |
| callback | entityType | event | |
| duration | entityAttribute | | |
| accuracy | | | |

FIG. 5

ACCESSING DATA FROM A DATABASE

CROSS-REFERENCE TO RELATED APPLICATION

This application claims the benefit of U.S. Provisional Application No. 63/394,592, filed Aug. 2, 2022, the contents of which are incorporated by reference herein.

TECHNICAL FIELD

This disclosure generally relates to accessing data corresponding to a user query from a database.

BACKGROUND

High-precision laser scanners (e.g., MEMS scanners) have been developed that can turn any surface into a virtual interface (VI). For example, a laser projected VI can be projected onto the palm of a user's hand or other surface. Three-dimensional (3D) depth sensors (e.g., a time of flight (TOF) camera) can be used to detect user gestures that are interacting with one or more VI elements projected on the surface. In the case of the user's palm, there is very little surface area in which to project a detailed VI. This limited space can limit the number and types of user interactions with the VI, and accordingly potentially limit the number and types of applications that rely on the VI for input and output.

SUMMARY

Systems, methods, devices and non-transitory, computer-readable storage mediums are disclosed for efficiently accessing data that corresponds to a particular user query from a database.

One aspect of the described techniques relates to a method for training a machine learning model configured to provide data corresponding to a user query from a database. In general, a server, a system, an edge device, or a processor implementing the described techniques can receive a user query for data stored in a database. The user query can be authored in a particular natural language, e.g., English. The processor can determine a prompt file for the user query, where both the prompt file and the user query are used for training a machine learning model. The prompt file can include multiple example query pairs, each having a first query represented in the particular natural language, and a second query corresponding to the first query and represented in a particular database language, e.g., SQL. The processor can train the machine learning model using the prompt file and the user query to generate a prediction for the user query. For example, the machine learning model can be trained to "translate" a user query into a database query, i.e., generating a predicted database query, which is represented in the particular database language, that corresponds to the user query, which is originally drafted in the particular natural language.

The processor can determine whether a predicted database query is accurate enough (e.g., satisfying a particular accuracy requirement) for an input user query by comparing the prediction based on a ground-truth database query for the user query.

In response to determining that prediction does not satisfy a threshold level of accuracy, the processor can update the prompt file with additional example query pairs for further training the machine learning model. Alternatively, or additionally, the system can generate one or more prompt files having example query pairs for fine-tuning the trained machine learning model.

In response to determining that the prediction satisfies a threshold level of accuracy, the processor can, using the trained machine learning model, generate a predicted database query for another user query, fetch data from a database based on the predicted database query, and provide the fetched data corresponding to the other user query.

Another aspect of the described techniques relates to a method of performing inference operations of the above-trained machine learning model. In general, a server, a system, an edge device, or a processor implementing the described techniques can receive a particular user query represented in a natural language. The processor can process the particular user query using the above-trained machine learning model to generate a prediction for the user query, where the prediction includes a predicted database query corresponding to the user query and is represented in a database language. The processor can fetch data from the database based on the database query, and provide the fetched data as an output for the user query.

In some implementations, the processor can determine that the user query is represented in a first natural language that is different from a second natural language using which the machine learning model is trained, or that the trained machine learning model receives. In response, the processor can convert the user query into the second natural language that is compatible with the trained machine learning model. Alternatively, or additionally, the processor can convert the fetched data into the second natural language, and optionally, translate the fetched data from the second natural language into the first natural language of the user query, before providing the fetched data as an output for a particular user query.

In some implementations, the processor can determine multiple domains for a database, e.g., a first domain for data relevant to books, a second domain for data relevant to movies, and a third domain for data relevant to addresses, among other domains. The processor can generate a query feature vector for a user query, and generate a domain feature vector for each of the multiple domains. The system can compare the query feature vectors and domain features vectors to determine a domain for the user query.

In some implementations, the processor can receive the user query from an input interface (e.g., an input interface corresponding to a wearable multimedia device), and present output data corresponding to the user query on an output interface (e.g., an output interface corresponding to a wearable multimedia device). The input interface and/or the output interface can be a virtual interface, which is projected on a surface proximate to an electronic device, e.g., a wearable multimedia device.

Another aspect of the described techniques relates to a method for training a machine learning model to provide data corresponding to a user query, the method comprising: receiving a user query for data stored in a database, wherein the user query is represented in a first natural language; determining a prompt file for the user query, wherein the prompt file comprises one or more pairs of example queries, wherein an example query pair comprises a first query represented in the first natural language, and a respective second query represented in a database language; providing the prompt file and the user query as input for training a machine learning model, wherein the machine learning model is configured to generate a prediction for the user query, wherein training the machine learning model comprises updating network parameters in the machine learning model based on the one or more pairs of example queries in the prompt file; receiving the prediction generated for the user query, wherein the prediction comprises a predicted database query represented in the database language corresponding to the user query; and determining whether the predicted database query, based on a ground-truth database query for the user query, satisfies a level of accuracy.

In some implementations, determining the prompt file for the user query includes: determining a plurality of domains for the database; and selecting, as a query domain, a domain from the plurality of domains for generating the prompt file for the user query. In some implementations, providing the prompt file and the user query to the machine learning model comprises: generating one or more additional prompt files for the query domain, each of the one or more additional prompt files comprising one or more pairs of example queries corresponding to the query domain; and providing the one or more additional prompt files to the machine learning model for updating the machine learning model, wherein updating the machine learning model comprises: further updating network parameters in the machine learning model when processing, using the machine learning model, the one or more additional prompt files and the user query.

The disclosed techniques can be performed using one or more electronic devices, which include a wearable multimedia device having one or more processors configured to perform the operations described above.

In general, a wearable multimedia device can include a projector subsystem configured to present information visually to a user in the form of projected light. For example, the projector subsystem can project light onto a surface (e.g., a surface of a user's hand, such as the user's palm) according to a particular spatial and/or temporal pattern, such that the user perceives a VI with one or more user interface elements. Further, the user can perform gestures to interact with the VI.

In some implementations, a wearable multimedia device can present a VI that allows a user to compose a message that includes a user query for data in a database. This VI may also be referred to as a message composition interface.

As an example, the message composition interface can include a composition user interface (UI) element for composing a user query and/or receiving data corresponding to the user query. Further, the message composition interface can present one or more selectable options, each corresponding to a different available application and/or service for sending the message.

The implementations described herein can provide one or more benefits noted below. For instance, the described techniques can be used to efficiently access data corresponding to a user query stored in a database. More specifically, the system can, using a machine learning model, process a user query that is represented in a natural language and generate a corresponding predicted database query represented in a database language. Accordingly, the user query can be composed more flexibly in a natural language, instead of being composed strictly following the syntax for database queries. The process of generating the predicted database query using a machine learning model can be fast and cost less computation resources and time, and the predicted database query generated by the trained machine learning model can satisfy various accuracy requirements. Accordingly, a user can obtain data faster and more efficiently from a database.

Further, the described techniques can be robust to different scenarios or requirements for fetching data from a database in response to a user query. More specifically, the system includes a framework of using a machine learning model to assist with efficiently fetching data from a database, where the framework can interface a suitable machine learning model with suitable techniques according to different inference or training requirements. For example, a trained machine learning model can include a recurrent neural network (e.g., a unidirectional RNN, a bi-directional RNN, a long short term memory (LSTM) model, or a transformer) with different preprocessing and/or encoding techniques (e.g., tokenization, stemming, N-Grams, one-hot encodings, or embeddings) for natural language processing. The described techniques can be trained to generate database query in different database languages, e.g., SQL, OpenCypher, Datalog, FQL, HTSQL, GraphQL, SPARQL, or any other suitable database languages.

In addition, the described techniques can detect a natural language that a user query is composed in, and translate or convert the user query from the natural language to another natural language that is compatible with the trained machine learning model. For example, the user query can be composed in Chinese and the machine learning model may be trained for user queries in English. The described techniques can detect the user query in Chinese and convert the user query in English for further operations.

The details of the disclosed embodiments are set forth in the accompanying drawings and the description below. Other features, objects and advantages are apparent from the description, drawings and claims.

DESCRIPTION OF DRAWINGS

FIG. 5 illustrates data objects used by the data processing system of FIG. 2, according to an embodiment.

The same reference symbol used in various drawings indicates like elements.

DETAILED DESCRIPTION

Example Wearable Multimedia Device

Figure 1:
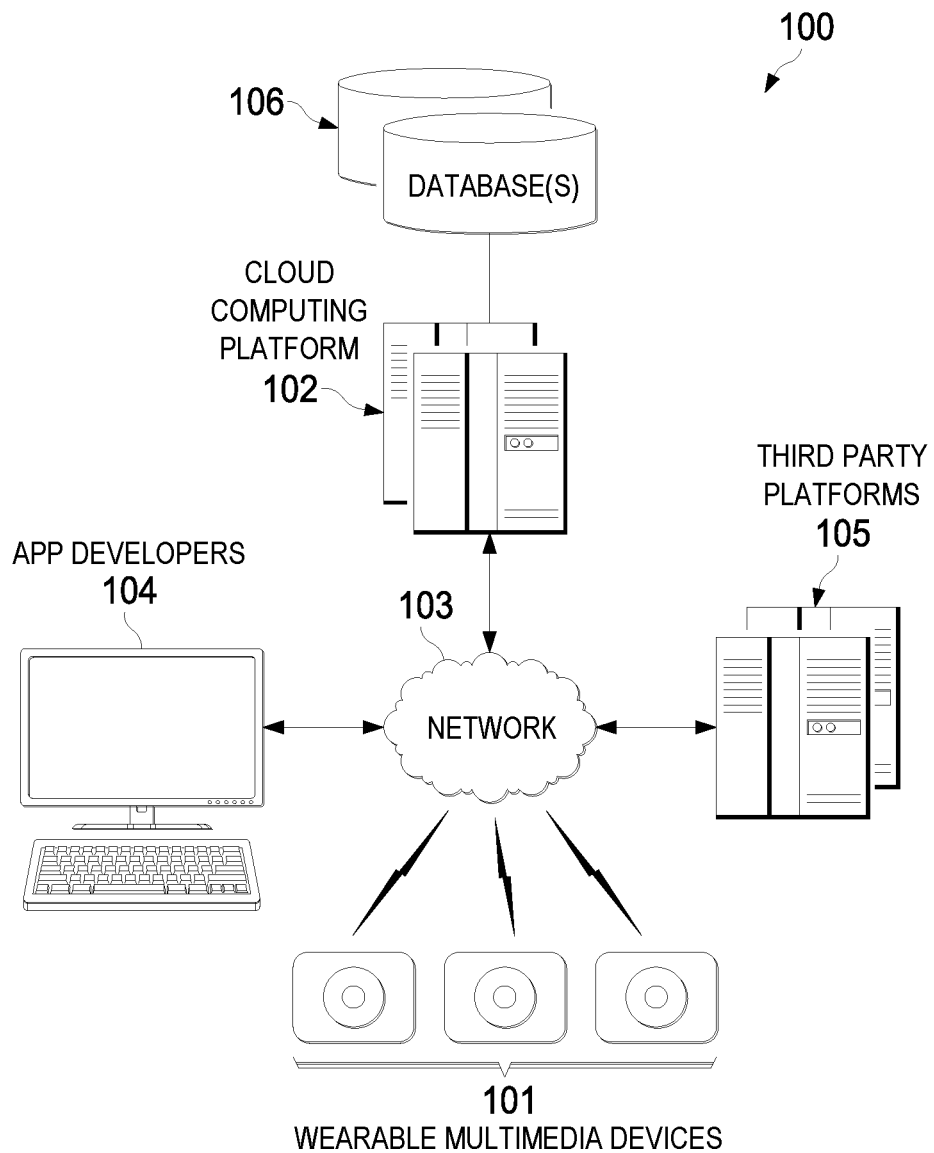
FIG. 1 is a block diagram of an operating environment for a wearable multimedia device and cloud computing platform with an application ecosystem for processing multimedia data captured by the wearable multimedia device, according to an embodiment

The features and processes described herein can be implemented on a wearable multimedia device. In an embodiment, the wearable multimedia device is a lightweight, small form factor, battery-powered device that can be attached to a user's clothing or an object using a tension clasp, interlocking pin back, magnet, or any other attachment mechanism. The wearable multimedia device includes a digital image capture device (e.g., a camera with a 180° FOV with optical image stabilizer (OIS)) that allows a user to spontaneously and/or continuously capture multimedia data (e.g., video, audio, depth data, biometric data) of life events ("moments") and document transactions (e.g., financial transactions) with minimal user interaction or device set-up. The multimedia data ("context data") captured by the wireless multimedia device is uploaded to a cloud computing platform with an application ecosystem that allows the context data to be processed, edited and formatted by one or more applications (e.g., Artificial Intelligence (AI) applications) into any desired presentation format (e.g., single image, image stream, video clip, audio clip, multimedia presentation, or image gallery) that can be downloaded and replayed on the wearable multimedia device and/or any other playback device. For example, the cloud computing platform can transform video data and audio data into any desired filmmaking style (e.g., documentary, lifestyle, candid, photojournalism, sport, street) specified by the user.

In an embodiment, the context data is processed by server computer(s) of the cloud computing platform based on user preferences. For example, images can be color graded, stabilized and cropped perfectly to the moment the user wants to relive based on the user's preferences. The user preferences can be stored in a user profile created by the user through an online account accessible through a website or portal, or the user preferences can be learned by the platform over time (e.g., using machine learning). In an embodiment, the cloud computing platform is a scalable distributed computing environment. For example, the cloud computing platform can be a distributed streaming platform (e.g., Apache Kafka™) with real-time streaming data pipelines and streaming applications that transform or react to streams of data.

In an embodiment, the user can start and stop a context data capture session on the wearable multimedia device with a simple touch gesture (e.g., a tap or swipe), by speaking a command or any other input mechanism. All or portions of the wearable multimedia device can automatically power down when it detects that it is not being worn by the user using one or more sensors (e.g., proximity sensor, optical sensor, accelerometers, gyroscopes).

The context data can be encrypted and compressed and stored in an online database associated with a user account using any desired encryption or compression technology. The context data can be stored for a specified period of time that can be set by the user. The user can be provided through a website, portal or mobile application with opt-in mechanisms and other tools for managing their data and data privacy.

In an embodiment, the context data includes point cloud data to provide three-dimensional (3D) surface mapped objects that can be processed using, for example, augmented reality (AR) and virtual reality (VR) applications in the application ecosystem. The point cloud data can be generated by a depth sensor (e.g., LiDAR or Time of Flight (TOF)) embedded on the wearable multimedia device.

In an embodiment, the wearable multimedia device includes a Global Navigation Satellite System (GNSS) receiver (e.g., Global Positioning System (GPS)) and one or more inertial sensors (e.g., accelerometers, gyroscopes) for determining the location and orientation of the user wearing the device when the context data was captured. In an embodiment, one or more images in the context data can be used by a localization application, such as a visual odometry application, in the application ecosystem to determine the position and orientation of the user.

In an embodiment, the wearable multimedia device can also include one or more environmental sensors, including but not limited to: an ambient light sensor, magnetometer, pressure sensor, voice activity detector, etc. This sensor data can be included in the context data to enrich a content presentation with additional information that can be used to capture the moment.

In an embodiment, the wearable multimedia device can include one or more biometric sensors, such as a heart rate sensor, fingerprint scanner, etc. This sensor data can be included in the context data to document a transaction or to indicate the emotional state of the user during the moment (e.g., elevated heart rate could indicate excitement or fear).

In an embodiment, the wearable multimedia device includes a headphone jack connecting a headset or earbuds, and one or more microphones for receiving voice commands and capturing ambient audio. In an alternative embodiment, the wearable multimedia device includes short range communication technology, including but not limited to Bluetooth, IEEE 802.15.4 (ZigBee™) and near field communications (NFC). The short range communication technology can be used to wirelessly connect to a wireless headset or earbuds in addition to, or in place of the headphone jack, and/or can wirelessly connect to any other external device (e.g., a computer, printer, projector, television and other wearable devices).

In an embodiment, the wearable multimedia device includes a wireless transceiver and communication protocol stacks for a variety of communication technologies, including Wi-Fi, 3G, 4G and 5G communication technologies. In an embodiment, the headset or earbuds also include sensors (e.g., biometric sensors, inertial sensors) that provide information about the direction the user is facing, to provide commands with head gestures or playback of spatial audio, etc. In an embodiment, the camera direction can be controlled by the head gestures, such that the camera view follows the user's view direction. In an embodiment, the wearable multimedia device can be embedded in or attached to the user's glasses.

In an embodiment, the wearable multimedia device includes a projector (e.g., a laser projector) or other digital projection technology (e.g., Liquid Crystal on Silicon (LCoS or LCOS), Digital Light Processing (DLP) or Liquid Crystal Display (LCD) technology), or can be wired or wirelessly coupled to an external projector, that allows the user to replay a moment on a surface such as a wall or table top or on a surface of the user's hand (e.g., the user's palm). In another embodiment, the wearable multimedia device includes an output port that can connect to a projector or other output device.

In an embodiment, the wearable multimedia capture device includes a touch surface responsive to touch gestures (e.g., a tap, multi-tap or swipe gesture). The wearable multimedia device may include a small display for presenting information and one or more light indicators to indicate on/off status, power conditions or any other desired status.

In an embodiment, the cloud computing platform can be driven by context-based gestures (e.g., air gesture) in combination with speech queries, such as the user pointing to an object in their environment and saying: "What is that building?" The cloud computing platform uses the air gesture to narrow the scope of the viewport of the camera and isolate the building. One or more images of the building are captured and optionally cropped (e.g., to protect privacy) and sent to the cloud computing platform where an image recognition application can run an image query and store or return the results to the user. Air and touch gestures can also be performed on a projected ephemeral display, for example, responding to user interface elements projected on a surface.

In an embodiment, the context data can be encrypted on the device and on the cloud computing platform so that only the user or any authorized viewer can relive the moment on a connected screen (e.g., smartphone, computer, television, etc.) or as a projection on a surface. An example architecture for the wearable multimedia device is described in reference to FIG. 8.

In addition to personal life events, the wearable multimedia device simplifies the capture of financial transactions that are currently handled by smartphones. The capture of everyday transactions (e.g., business transactions, micro transactions) is made simpler, faster and more fluid by using sight assisted contextual awareness provided by the wearable multimedia device. For example, when the user engages in a financial transaction (e.g., making a purchase), the wearable multimedia device will generate data memorializing the financial transaction, including a date, time, amount, digital images or video of the parties, audio (e.g., user commentary describing the transaction) and environment data (e.g., location data). The data can be included in a multimedia data stream sent to the cloud computing platform, where it can be stored online and/or processed by one or more financial applications (e.g., financial management, accounting, budget, tax preparation, inventory, etc.).

In an embodiment, the cloud computing platform provides graphical user interfaces on a website or portal that allow various third party application developers to upload, update and manage their applications in an application ecosystem. Some example applications can include but are not limited to: personal live broadcasting (e.g., Instagram™ Life, Snapchat™), senior monitoring (e.g., to ensure that a loved one has taken their medicine), memory recall (e.g., showing a child's soccer game from last week) and personal guide (e.g., AI enabled personal guide that knows the location of the user and guides the user to perform an action).

In an embodiment, the wearable multimedia device includes one or more microphones and a headset. In some embodiments, the headset wire includes the microphone. In an embodiment, a digital assistant is implemented on the wearable multimedia device that responds to user queries, requests and commands. For example, the wearable multimedia device worn by a parent captures moment context data for a child's soccer game, and in particular a "moment" where the child scores a goal. The user can request (e.g., using a speech command) that the platform create a video clip of the goal and store it in their user account. Without any further actions by the user, the cloud computing platform identifies the correct portion of the moment context data (e.g., using face recognition, visual or audio cues) when the goal is scored, edits the moment context data into a video clip, and stores the video clip in a database associated with the user account.

In an embodiment, the wearable multimedia device can include photovoltaic surface technology to sustain battery life and inductive charging circuitry (e.g., Qi) to allow for inductive charging on charge mats and wireless over-the-air (OTA) charging.

In an embodiment, the wearable multimedia device is configured to magnetically couple or mate with a rechargeable portable battery pack. The portable battery pack includes a mating surface that has permanent magnet (e.g., N pole) disposed thereon, and the wearable multimedia device has a corresponding mating surface that has permanent magnet (e.g., S pole) disposed thereon. Any number of permanent magnets having any desired shape or size can be arranged in any desired pattern on the mating surfaces.

The permanent magnets hold portable battery packs and a wearable multimedia device together in a mated configuration with clothing (e.g., a user's shirt) in between. In an embodiment, the portable battery pack and wearable multimedia device have the same mating surface dimensions, such that there are no overhanging portions when in a mated configuration. A user magnetically fastens the wearable multimedia device to their clothing by placing the portable battery pack underneath their clothing and placing the wearable multimedia device on top of the portable battery pack outside their clothing, such that permanent magnets attract each other through the clothing.

In an embodiment, the portable battery pack has a built-in wireless power transmitter which is used to wirelessly power the wearable multimedia device while in the mated configuration using the principle of resonant inductive coupling. In an embodiment, the wearable multimedia device includes a built-in wireless power receiver which is used to receive power from the portable battery pack while in the mated configuration.

System Overview

FIG. 1 is a block diagram of an operating environment for a wearable multimedia device and cloud computing platform with an application ecosystem for processing multimedia data captured by the wearable multimedia device, according to an embodiment. Operating environment 100 includes wearable multimedia devices 101, cloud computing platform 102, network 103, application ("app") developers 104 and third party platforms 105. Cloud computing platform 102 is coupled to one or more databases 106 for storing context data uploaded by wearable multimedia devices 101.

As previously described, wearable multimedia devices 101 are lightweight, small form factor, battery-powered devices that can be attached to a user's clothing or an object using a tension clasp, interlocking pin back, magnet or any other attachment mechanism. Wearable multimedia devices 101 include a digital image capture device (e.g., a camera with a 180° FOV and OIS) that allows a user to spontaneously capture multimedia data (e.g., video, audio, depth data) of "moments" and document every day transactions (e.g., financial transactions) with minimal user interaction or device set-up. The context data captured by wireless multimedia devices 101 are uploaded to cloud computing platform 102. Cloud computing platform 102 includes an application ecosystem that allows the context data to be processed, edited and formatted by one or more server side applications into any desired presentation format (e.g., single image, image stream, video clip, audio clip, multimedia presentation, images gallery) that can be downloaded and replayed on the wearable multimedia device and/or other playback device.

By way of example, at a child's birthday party a parent can clip the wearable multimedia device on their clothing (or attach the device to a necklace or chain and wear around their neck) so that the camera lens is facing in their view direction. The camera includes a 180° FOV that allows the camera to capture almost everything that the user is currently seeing. The user can start recording by simply tapping the surface of the device or pressing a button or speaking a command. No additional set-up is required. A multimedia data stream (e.g., video with audio) is recorded that captures the special moments of the birthday (e.g., blowing out the candles). This "context data" is sent to cloud computing platform 102 in real-time through a wireless network (e.g., Wi-Fi, cellular). In an embodiment, the context data is stored on the wearable multimedia device so that it can be uploaded at a later time. In another embodiment, the user can transfer the context data to another device (e.g., personal computer hard drive, smartphone, tablet computer, thumb drive) and upload the context data to cloud computing platform 102 at a later time using an application.

In an embodiment, the context data is processed by one or more applications of an application ecosystem hosted and managed by cloud computing platform 102. Applications can be accessed through their individual application programming interfaces (APIs). A custom distributed streaming pipeline is created by cloud computing platform 102 to process the context data based on one or more of the data type, data quantity, data quality, user preferences, templates and/or any other information to generate a desired presentation based on user preferences. In an embodiment, machine learning technology can be used to automatically select suitable applications to include in the data processing pipeline with or without user preferences. For example, historical user context data stored in a database (e.g., NoSQL database) can be used to determine user preferences for data processing using any suitable machine learning technology (e.g., deep learning or convolutional neural networks).

In an embodiment, the application ecosystem can include third party platforms 105 that process context data. Secure sessions are set-up between cloud computing platform 102 and third party platforms 105 to send/receive context data. This design allows third party app providers to control access to their application and to provide updates. In other embodiments, the applications are run on servers of cloud computing platform 102 and updates are sent to cloud computing platform 102. In the latter embodiment, app developers 104 can use an API provided by cloud computing platform 102 to upload and update applications to be included in the application ecosystem.

Example Data Processing System

Figure 2:
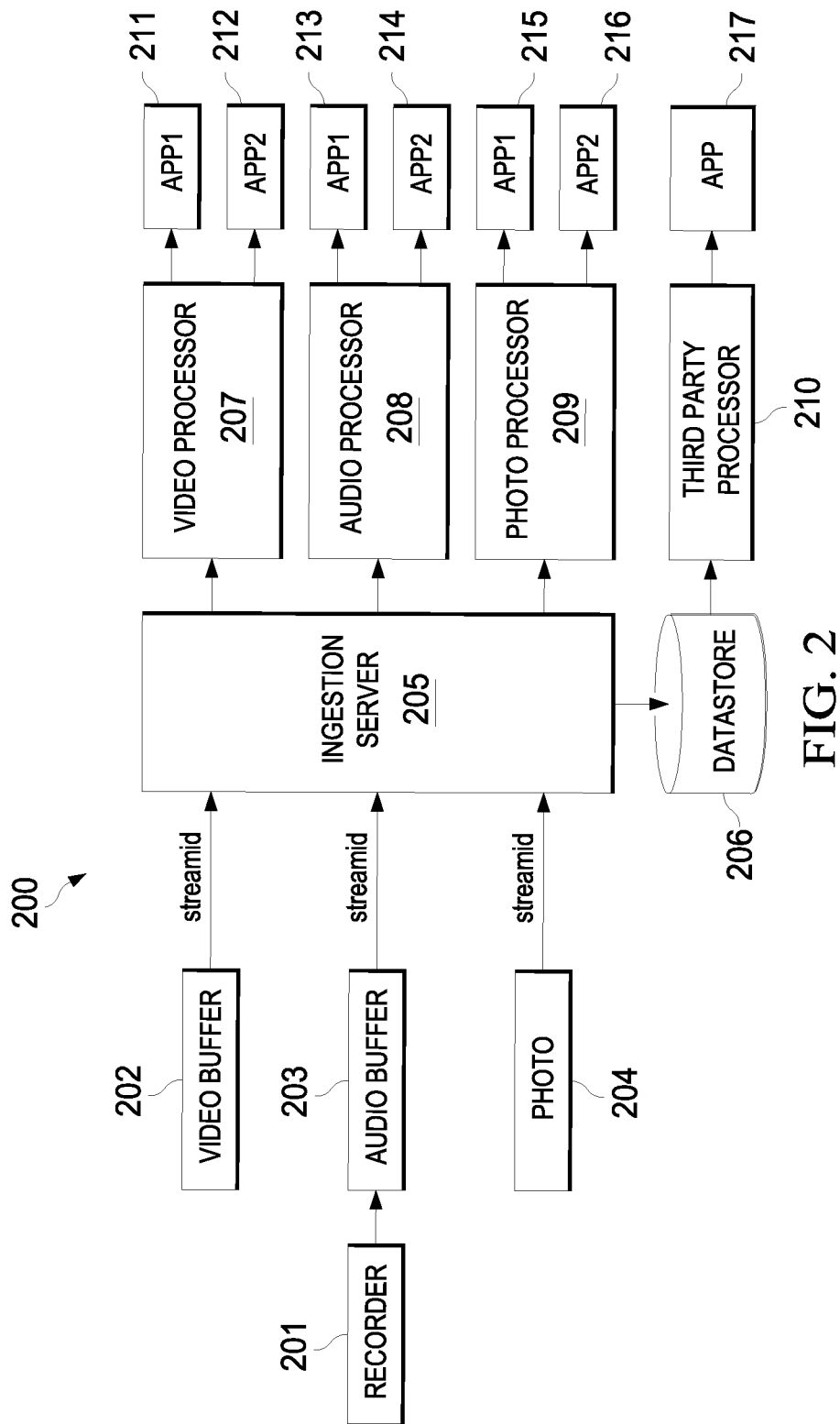
FIG. 2 is a block diagram of a data processing system implemented by the cloud computing platform of FIG. 1, according to an embodiment.

FIG. 2 is a block diagram of a data processing system implemented by the wearable multimedia device and the cloud computing platform of FIG. 1, according to an embodiment. Data processing system 200 includes recorder 201, video buffer 202, audio buffer 203, photo buffer 204, ingestion server 205, data store 206, video processor 207, audio processor 208, photo processor 209 and third party processor 210.

A recorder 201 (e.g., a software application) running on a wearable multimedia device records video, audio and photo data ("context data") captured by a camera and audio subsystem, and stores the data in buffers 202, 203, 204, respectively. This context data is then sent (e.g., using wireless OTA technology) to ingestion server 205 of cloud computing platform 102. In an embodiment, the data can be sent in separate data streams each with a unique stream identifier (streamid). The streams are discrete pieces of data that may include the following example attributes: location (e.g., latitude, longitude), user, audio data, video stream of varying duration and N number of photos. A stream can have a duration of 1 to MAXSTREAM_LEN seconds, where in this example MAXSTREAM_LEN=20 seconds.

Ingestion server 205 ingests the streams and creates a stream record in data store 206 to store the results of processors 207-209. In an embodiment, the audio stream is processed first and is used to determine the other streams that are needed. Ingestion server 205 sends the streams to the appropriate processor 207-209 based on streamid. For example, the video stream is sent to video processor 207, the audio stream is sent to audio processor 208 and the photo stream is sent to photo processor 209. In an embodiment, at least a portion of data collected from the wearable multimedia device (e.g., image data) is processed into metadata and encrypted so that it can be further processed by a given application and sent back to the wearable multimedia device or other device.

Processors 207-209 can run proprietary or third party applications as previously described. For example, video processor 207 can be a video processing server that sends raw video data stored in video buffer 202 to a set of one or more image processing/editing applications 211, 212 based on user preferences or other information. Processor 207 sends requests to applications 211, 212, and returns the results to ingestion server 205. In an embodiment, a third party processor 210 can process one or more of the streams using its own processor and application 217. In another example, audio processor 208 can be an audio processing server that sends speech data stored in audio buffer 203 to speech-to-text converter applications 213, 214. In another example, photo processor 209 can be an image processing server that sends image data stored in photo buffer 204 to image processing applications 215, 216.

Example Scene Identification Application

Figure 3:
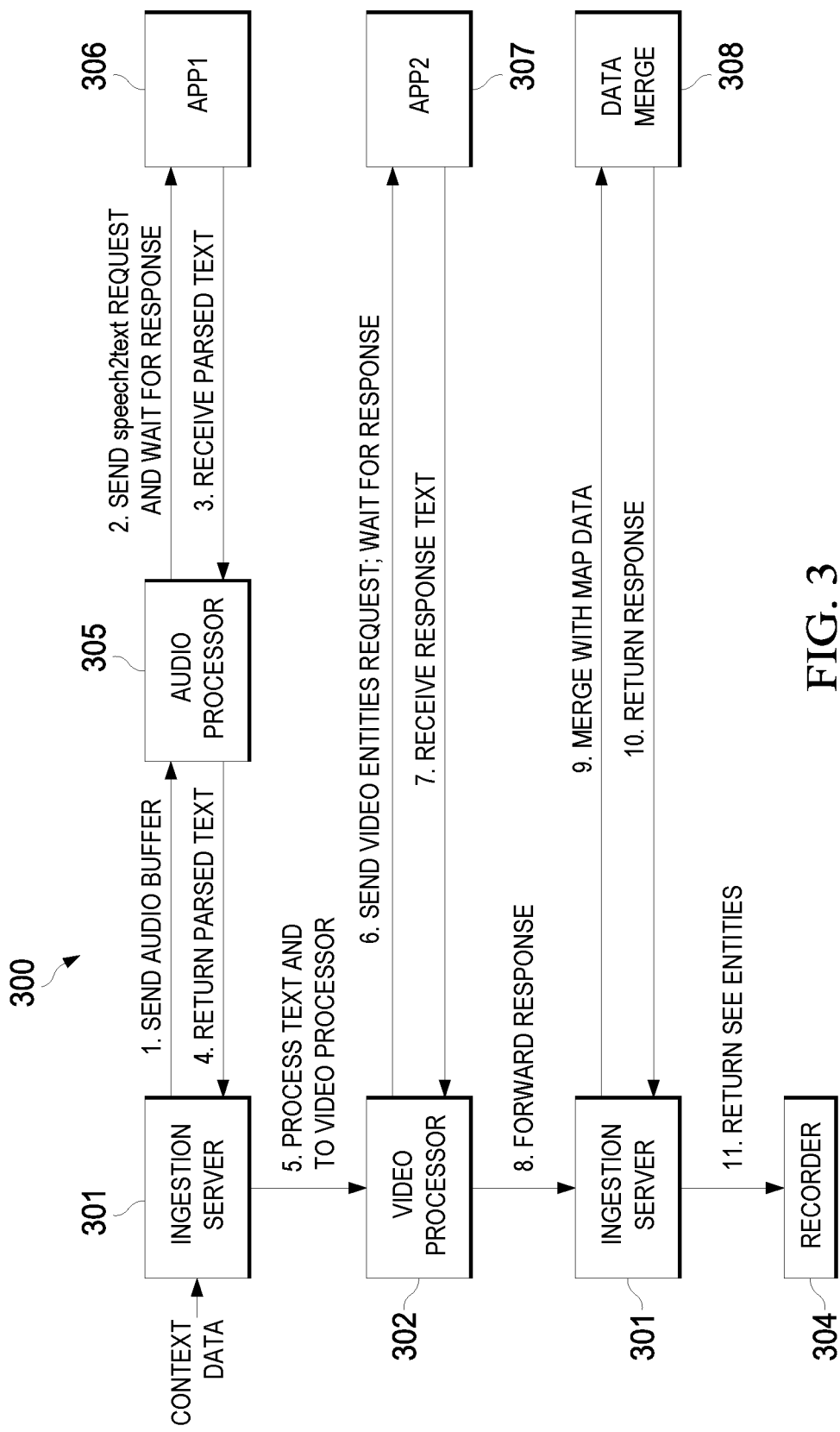
FIG. 3 is a block diagram of a data processing pipeline for processing a context data stream, according to an embodiment.

FIG. 3 is a block diagram of a data processing pipeline for processing a context data stream, according to an embodiment. In this embodiment, data processing pipeline 300 is created and configured to determine what the user is seeing based on the context data captured by a wearable multimedia device worn by the user. Ingestion server 301 receives an audio stream (e.g., including user commentary) from audio buffer 203 of the wearable multimedia device and sends the audio stream to audio processor 305. Audio processor 305 sends the audio stream to app 306 which performs speech-to-text conversion and returns parsed text to audio processor 305. Audio processor 305 returns the parsed text to ingestion server 301.

Video processor 302 receives the parsed text from ingestion server 301 and sends a request to video processing app 307. Video processing app 307 identifies objects in the video scene and uses the parsed text to label the objects. Video processing app 307 sends a response describing the scene (e.g., labeled objects) to video processor 302. Video processor then forwards the response to ingestion server 301.

Ingestion server 301 sends the response to data merge process 308, which merges the response with the user's location, orientation and map data. Data merge process 308 returns a response with a scene description to recorder 304 on the wearable multimedia device. For example, the response can include text describing the scene as the child's birthday party, including a map location and a description of objects in the scene (e.g., identify people in the scene). Recorder 304 associates the scene description with the multimedia data (e.g., using a streamid) stored on the wearable multimedia device. When the user recalls the data, the data is enriched with the scene description.

In an embodiment, data merge process 308 may use more than just location and map data. There can also be a notion of ontology. For example, the facial features of the user's Dad captured in an image can be recognized by the cloud computing platform, and be returned as "Dad" rather than the user's name, and an address such as "555 Main Street, San Francisco, CA" can be returned as "Home." The ontology can be specific to the user and can grow and learn from the user's input.

Example Transportation Application

Figure 4:
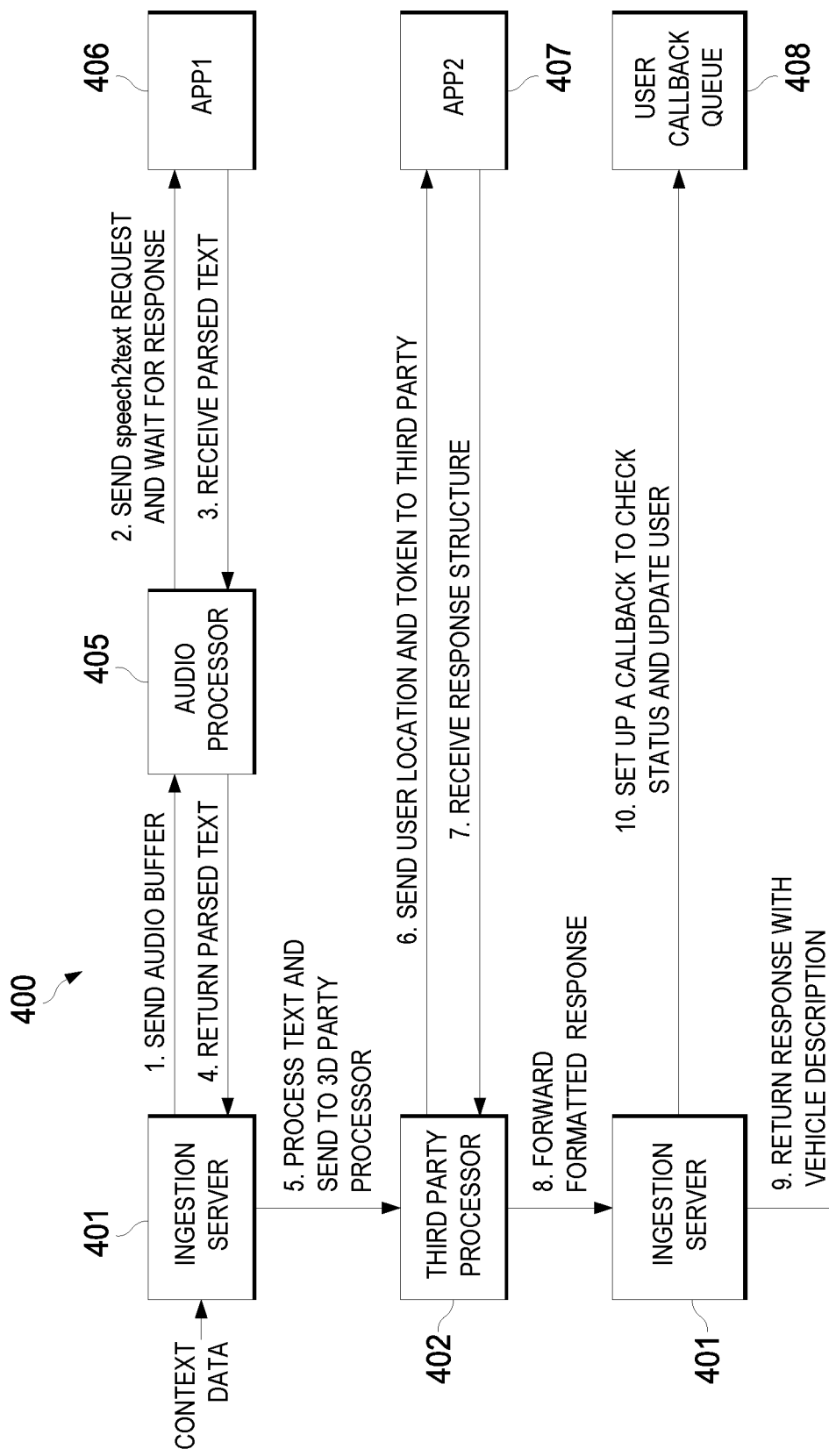
FIG. 4 is a block diagram of another data processing for processing a context data stream for a transportation application, according to an embodiment.

FIG. 4 is a block diagram of another data processing for processing a context data stream for a transportation application, according to an embodiment. In this embodiment, data processing pipeline 400 is created to call a transportation company (e.g., Uber®, Lyft®) to get a ride home. Context data from a wearable multimedia device is received by ingestion server 401 and an audio stream from an audio buffer 203 is sent to audio processor 405. Audio processor 405 sends the audio stream to app 406, which converts the speech to text. The parsed text is returned to audio processor 405, which returns the parsed text to ingestion server 401 (e.g., a user speech request for transportation). The processed text is sent to third party processor 402. Third party processor 402 sends the user location and a token to a third party application 407 (e.g., Uber® or Lyft™® application). In an embodiment, the token is an API and authorization token used to broker a request on behalf of the user. Application 407 returns a response data structure to a third party processor 402, which is forwarded to ingestion server 401. Ingestion server 401 checks the ride arrival status (e.g., ETA) in the response data structure and sets up a callback to the user in user callback queue 408. Ingestion server 401 returns a response with a vehicle description to recorder 404, which can be spoken to the user by a digital assistant through a loudspeaker on the wearable multimedia device, or through the user's headphones or earbuds via a wired or wireless connection.

FIG. 5 illustrates data objects used by the data processing system of FIG. 2, according to an embodiment. The data objects are part of software component infrastructure instantiated on the cloud computing platform. A "streams" object includes the data streamid, deviceid, start, end, lat, lon, attributes and entities. "Streamid" identifies the stream (e.g., video, audio, photo), "deviceid" identifies the wearable multimedia device (e.g., a mobile device ID), "start" is the start time of the context data stream, "end" is the end time of the context data stream, "lat" is the latitude of the wearable multimedia device, "lon" is the longitude of the wearable multimedia device, "attributes" include, for example, birthday, facial points, skin tone, audio characteristics, address, phone number, etc., and "entities" make up an ontology. For example, the name "John Do" would be mapped to "Dad" or "Brother" depending on the user.

A "Users" object includes the data userid, deviceid, email, fname and lname. Userid identifies the user with a unique identifier, deviceid identifies the wearable device with a unique identifier, email is the user's registered email address, fname is the user's first name and lname is the user's last name. A "Userdevices" object includes the data userid and deviceid. A "devices" object includes the data deviceid, started, state, modified and created. In an embodiment, deviceid is a unique identifier for the device (e.g., distinct from a MAC address). Started is when the device was first started. State is on/off/sleep. Modified is the last modified date, which reflects the last state change or operating system (OS) change. Created is the first time the device was turned on.

A "ProcessingResults" object includes the data streamid, ai, result, callback, duration and accuracy. In an embodiment, streamid is each user stream as a Universally Unique Identifier (UUID). For example, a stream that was started from 8:00 AM to 10:00 AM will have id:15h158dhb4 and a stream that starts from 10:15 AM to 10:18 AM will have a UUID that was contacted for this stream. AI is the identifier for the platform application that was used for this stream. Result is the data sent from the platform application. Callback is the callback that was used (versions can change hence the callback is tracked in case the platform needs to replay the request). Accuracy is the score for how accurate the result set is. In an embodiment, processing results can be used for multiple tasks, such as 1) to inform the merge server of the full set of results, 2) determine the fastest AI so that user experience can be enhanced, and 3) determine the most accurate ai. Depending on the use case, one may favor speed over accuracy or vice versa.

An "Entities" object includes the data entityID, userID, entityName, entityType and entityAttribute. EntityID is a UUID for the entity and an entity having multiple entries where the entityID references the one entity. For example, "Barack Obama" would have an entityID of 144, which could be linked in an associations table to POTUS44 or "Barack Hussein Obama" or "President Obama." UserID identifies the user that the entity record was made for. EntityName is the name that the userID would call the entity. For example, Malia Obama's entityName for entityID 144 could be "Dad" or "Daddy." EntityType is a person, place or thing. EntityAttribute is an array of attributes about the entity that are specific to the userID's understanding of that entity. This maps entities together so that when, for example, Malia makes the speech query: "Can you see Dad?", the cloud computing platform can translate the query to Barack Hussein Obama and use that in brokering requests to third parties or looking up information in the system.

Example Processes

Figure 6:
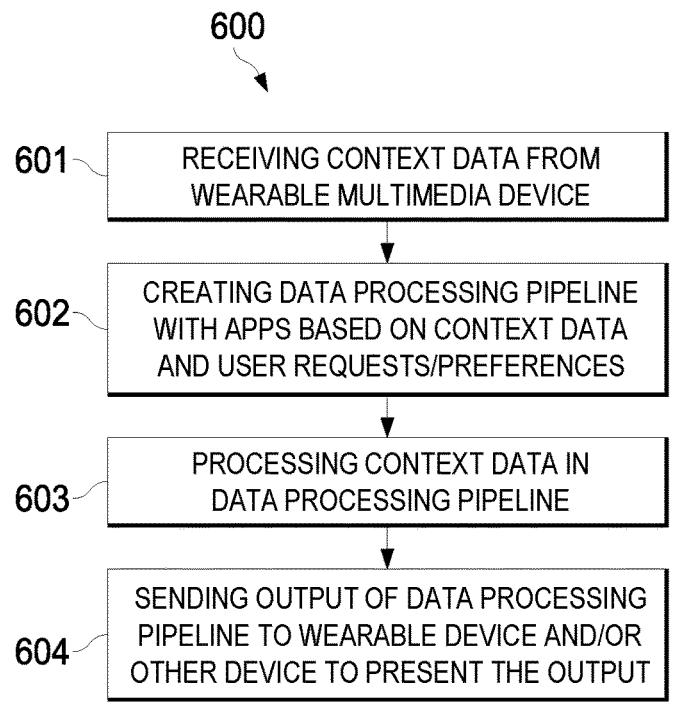
FIG. 6 is a flow diagram of a data pipeline process, according to an embodiment.

FIG. 6 is a flow diagram of a data pipeline process, according to an embodiment. Process 600 can be implemented using wearable multimedia devices 101 and cloud computing platform 102 described in reference to FIGS. 1-5.

Process 600 can begin by receiving context data from a wearable multimedia device (601). For example, the context data can include video, audio and still images captured by a camera and audio subsystem of the wearable multimedia device.

Process 600 can continue by creating (e.g., instantiating) a data processing pipeline with applications based on the context data and user requests/preferences (602). For example, based on user requests or preferences, and also based on the data type (e.g., audio, video, photo), one or more applications can be logically connected to form a data processing pipeline to process the context data into a presentation to be playback on the wearable multimedia device or another device.

Process 600 can continue by processing the context data in the data processing pipeline (603). For example, speech from user commentary during a moment or transaction can be converted into text, which is then used to label objects in a video clip.

Process 600 can continue by sending the output of the data processing pipeline to the wearable multimedia device and/or other playback devices (604).

Example Cloud Computing Platform Architecture

Figure 7:
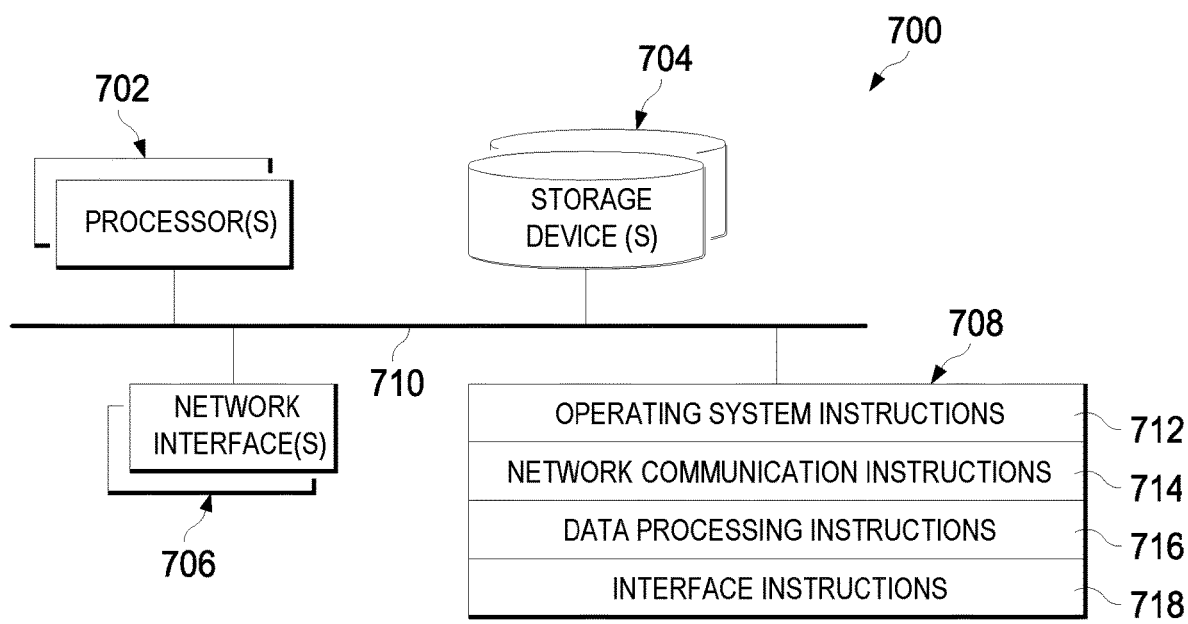
FIG. 7 is an architecture for the cloud computing platform, according to an embodiment.

FIG. 7 is an example architecture 700 for cloud computing platform 102 described in reference to FIGS. 1-6, according to an embodiment. Other architectures are possible, including architectures with more or fewer components. In some implementations, architecture 700 includes one or more processor(s) 702 (e.g., dual-core Intel® Xeon® Processors), one or more network interface(s) 706, one or more storage device(s) 704 (e.g., hard disk, optical disk, flash memory) and one or more computer-readable medium(s) 708 (e.g., hard disk, optical disk, flash memory, etc.). These components can exchange communications and data over one or more communication channel(s) 710 (e.g., buses), which can utilize various hardware and software for facilitating the transfer of data and control signals between components.

The term "computer-readable medium" refers to any medium that participates in providing instructions to processor(s) 702 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium(s) 708 can further include operating system 712 (e.g., Mac OS® server, Windows® NT server, Linux Server), network communication module 714, interface instructions 716 and data processing instructions 718.

Operating system 712 can be multi-user, multiprocessing, multitasking, multithreading, real time, etc. Operating system 712 performs basic tasks, including but not limited to: recognizing input from and providing output to devices 702, 704, 706 and 708; keeping track and managing files and directories on computer-readable medium(s) 708 (e.g., memory or a storage device); controlling peripheral devices; and managing traffic on the one or more communication channel(s) 710. Network communications module 714 includes various components for establishing and maintaining network connections (e.g., software for implementing communication protocols, such as TCP/IP, HTTP, etc.) and for creating a distributed streaming platform using, for example, Apache Kafka™. Data processing instructions 716 include server-side or backend software for implementing the server-side operations, as described in reference to FIGS. 1-6. Interface instructions 718 includes software for implementing a web server and/or portal for sending and receiving data to and from wearable multimedia devices 101, third party application developers 104 and third party platforms 105, as described in reference to FIG. 1.

Architecture 700 can be included in any computer device, including one or more server computers in a local or distributed network each having one or more processing cores. Architecture 700 can be implemented in a parallel processing or peer-to-peer infrastructure or on a single device with one or more processors. Software can include multiple software components or can be a single body of code.

Example Wearable Multimedia Device Architecture

Figure 8:
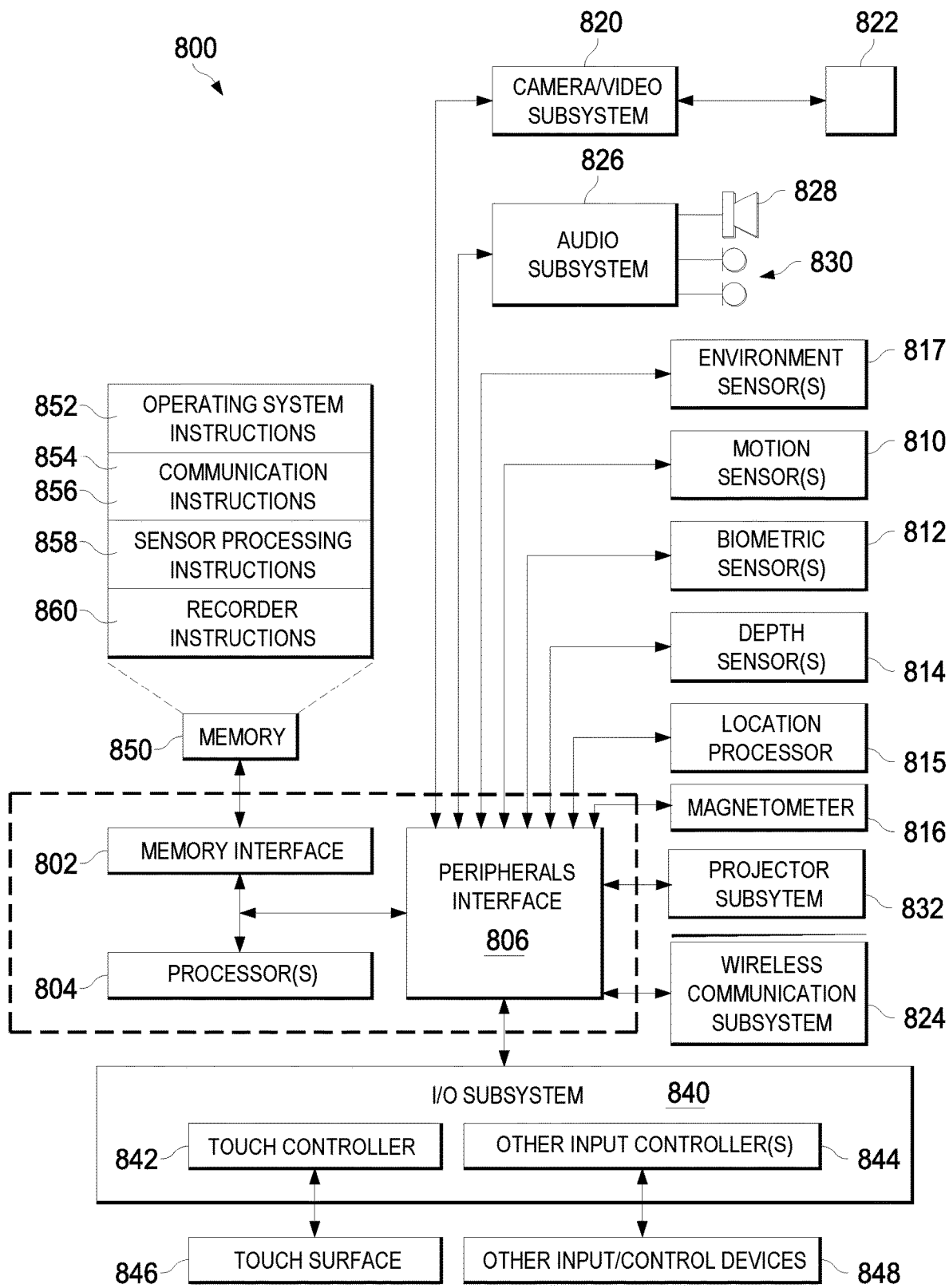
FIG. 8 is an architecture for the wearable multimedia device, according to an embodiment.

FIG. 8 is a block diagram of example architecture 800 for a wearable multimedia device implementing the features and processes described in reference to FIGS. 1-6. Architecture 800 may include memory interface 802, data processor(s), image processor(s) or central processing unit(s) 804, and peripherals interface 806. Memory interface 802, processor(s) 804 or peripherals interface 806 may be separate components or may be integrated in one or more integrated circuits. One or more communication buses or signal lines may couple the various components.

Sensors, devices, and subsystems may be coupled to peripherals interface 806 to facilitate multiple functions. For example, motion sensor(s) 810, biometric sensor(s) 812, and depth sensor(s) 814 may be coupled to peripherals interface 806 to facilitate motion, orientation, biometric, and depth detection functions. In some implementations, motion sensor(s) 810 (e.g., an accelerometer, rate gyroscope) may be utilized to detect movement and orientation of the wearable multimedia device.

Other sensors may also be connected to peripherals interface 806, such as environmental sensor(s) (e.g., temperature sensor, barometer, ambient light) to facilitate environment sensing functions. For example, a biometric sensor can detect fingerprints, face recognition, heart rate and other fitness parameters. In an embodiment, a haptic motor (not shown) can be coupled to the peripherals interface, which can provide vibration patterns as haptic feedback to the user.

Location processor 815 (e.g., GNSS receiver chip) may be connected to peripherals interface 806 to provide geo-referencing. Electronic magnetometer 816 (e.g., an integrated circuit chip) may also be connected to peripherals interface 806 to provide data that may be used to determine the direction of magnetic North. Accordingly, electronic magnetometer 816 may be used by an electronic compass application.

Camera subsystem 820 and an optical sensor 822, e.g., a charged coupled device (CCD) or a complementary metal-oxide semiconductor (CMOS) optical sensor, may be utilized to facilitate camera functions, such as recording photographs and video clips. In an embodiment, the camera has a 180° FOV and OIS. The depth sensor can include an infrared emitter that projects dots in a known pattern onto an object/subject. The dots are then photographed by a dedicated infrared camera and analyzed to determine depth data. In an embodiment, a time-of-flight (TOF) camera can be used to resolve distance based on the known speed of light and measuring the time-of-flight of a light signal between the camera and an object/subject for each point of the image.

Communication functions may be facilitated through one or more communication subsystems 824. Communication subsystem(s) 824 may include one or more wireless communication subsystems. Wireless communication subsystems 824 may include radio frequency receivers and transmitters and/or optical (e.g., infrared) receivers and transmitters. Wired communication systems may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data (e.g., a projector).

The specific design and implementation of the communication subsystem 824 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, IEEE802.xx communication networks (e.g., Wi-Fi, WiMax, ZigBee™), 3G, 4G, 4G LTE, code division multiple access (CDMA) networks, near field communication (NFC), Wi-Fi Direct and a Bluetooth™ network. Wireless communication subsystems 824 may include hosting protocols such that the device may be configured as a base station for other wireless devices. As another example, the communication subsystems may allow the device to synchronize with a host device using one or more protocols or communication technologies, such as, for example, TCP/IP protocol, HTTP protocol, UDP protocol, ICMP protocol, POP protocol, FTP protocol, IMAP protocol, DCOM protocol, DDE protocol, SOAP protocol, HTTP Live Streaming, MPEG Dash and any other known communication protocol or technology.

Audio subsystem 826 may be coupled to a speaker 828 and one or more microphones 830 to facilitate voice-enabled functions, such as voice recognition, voice replication, digital recording, telephony functions and beamforming.

I/O subsystem 840 may include touch controller 842 and/or another input controller(s) 844. Touch controller 842 may be coupled to a touch surface 846. Touch surface 846 and touch controller 842 may, for example, detect contact and movement or break thereof using any of a number of touch sensitivity technologies, including but not limited to, capacitive, resistive, infrared, and surface acoustic wave technologies, as well as other proximity sensor arrays or other elements for determining one or more points of contact with touch surface 846. In one implementation, touch surface 846 may display virtual or soft buttons, which may be used as an input/output device by the user.

Other input controller(s) 844 may be coupled to other input/control devices 848, such as one or more buttons, rocker switches, thumb-wheel, infrared port, USB port, and/or a pointer device such as a stylus. The one or more buttons (not shown) may include an up/down button for volume control of speaker 828 and/or microphone 830.

Further, a projector subsystem 832 may be connected to peripherals interface 806 to present information visually to a user in the form of projected light. For example, the projector subsystem 832 can project light onto a surface according to a particular spatial and/or temporal pattern, such that the user perceives text, images, videos, colors, patterns, and/or any other graphical information on the surface. In some implementations, the projector subsystem 832 can project light onto a surface of the user's body, such as the user's hand or palm. In some implementations, the projector subsystem 832 can project light onto a surface other than the user's body, such as a wall, a table, a desk, or any other object. The projector subsystem 832 is described in greater detail with reference to FIG. 9.

In some implementations, the projector subsystem 832 projects light onto a surface to provide an interactive VI for a user. For example, the projector subsystem 832 can project light onto the surface, such that the user perceives one or more interactive user interface elements (e.g., selectable buttons, dials, switches, boxes, images, videos, text, icons, etc.). Further, the user can interact with the VI by performing one or more gestures with respect to the VI and the user interface elements. For example, the user can perform a pointing gesture, a tapping gesture, a swiping gesture, a waving gesture, or any other gesture using her hands and/or fingers. The wearable multimedia device can detect the performed gestures using one or more sensors (e.g., the camera/video subsystems 820, environment sensor(s) 817, depth sensor(s) 814, etc.), identify one or more commands associated with those gestures, and execute the identified commands (e.g., using the processor(s) 804). Example VIs are described in further detail below.

In some implementations, device 800 plays back to a user recorded audio and/or video files (including spatial audio), such as MP3, AAC, spatial audio and MPEG video files. In some implementations, device 800 may include the functionality of an MP3 player and may include a pin connector or other port for tethering to other devices. Other input/output and control devices may be used. In an embodiment, device 800 may include an audio processing unit for streaming audio to an accessory device over a direct or indirect communication link.

Memory interface 802 may be coupled to memory 850. Memory 850 may include high-speed random access memory or non-volatile memory, such as one or more magnetic disk storage devices, one or more optical storage devices, or flash memory (e.g., NAND, NOR). Memory 850 may store operating system 852, such as Darwin, RTXC, LINUX, UNIX, OS X, iOS, WINDOWS, or an embedded operating system such as VxWorks. Operating system 852 may include instructions for handling basic system services and for performing hardware dependent tasks. In some implementations, operating system 852 may include a kernel (e.g., UNIX kernel).

Memory 850 may also store communication instructions 854 to facilitate communicating with one or more additional devices, one or more computers or servers, including peer-to-peer communications with wireless accessory devices, as described in reference to FIGS. 1-6. Communication instructions 854 may also be used to select an operational mode or communication medium for use by the device, based on a geographic location of the device.

Memory 850 may include sensor processing instructions 858 to facilitate sensor-related processing and functions and recorder instructions 860 to facilitate recording functions, as described in reference to FIGS. 1-6. Other instructions can include GNSS/Navigation instructions to facilitate GNSS and navigation-related processes, camera instructions to facilitate camera-related processes and user interface instructions to facilitate user interface processing, including a touch model for interpreting touch inputs.

Each of the above identified instructions and applications may correspond to a set of instructions for performing one or more functions described above. These instructions need not be implemented as separate software programs, procedures, or modules. Memory 850 may include additional instructions or fewer instructions. Furthermore, various functions of the device may be implemented in hardware and/or in software, including in one or more signal processing and/or application specific integrated circuits (ASICs).

Figure 9:
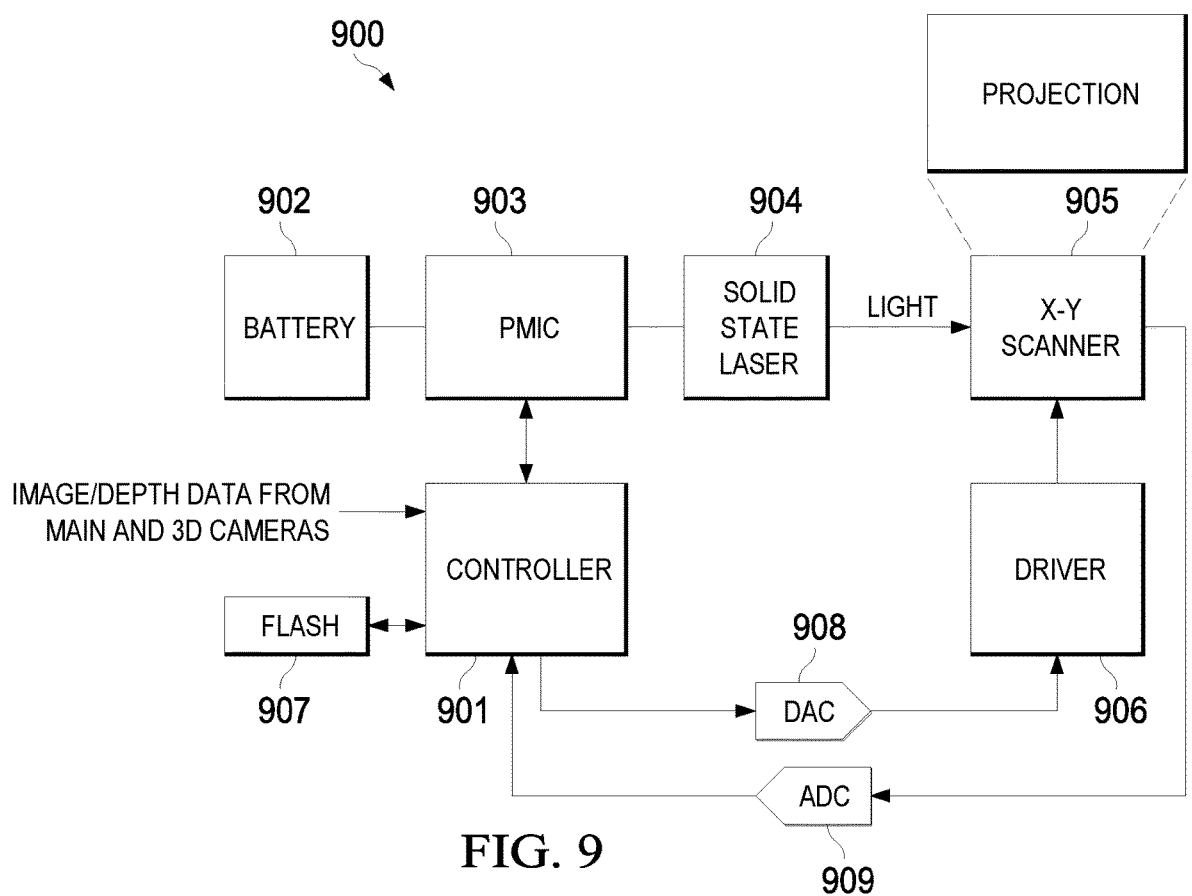
FIG. 9 is a system block diagram of a projector architecture, according to an embodiment.

FIG. 9 is a system block diagram of the projector subsystem 832, according to an embodiment. The projector subsystem 832 scans a pixel in two dimensions, images a 2D array of pixels, or mixes imaging and scanning. Scanning projectors directly utilize the narrow divergence of laser beams, and two-dimensional (2D) scanning to "paint" an image pixel by pixel. In some embodiments, separate scanners are used for the horizontal and vertical scanning directions. In other embodiments, a single biaxial scanner is used. The specific beam trajectory also varies depending on the type of scanner used.

In the example shown, the projector subsystem 832 is a scanning pico-projector that includes controller 901, battery 902, power management chip (PMIC) 903, solid state laser 904, X-Y scanner 905, driver 906, memory 907, digital-to-analog converter (DAC) 908 and analog-to-digital converter (ADC) 909.

Controller 901 provides control signals to X-Y scanner 905. X-Y scanner 905 uses moveable mirrors to steer the laser beam generated by solid state laser 904 in two dimensions in response to the control signals. X-Y scanner 905 includes one or more micro-electromechanical (MEMS) micromirrors that have controllable tilt angles in one or two dimensions. Driver 906 includes a power amplifier and other electronic circuitry (e.g., filters, switches) to provide the control signals (e.g., voltages or currents) to X-Y scanner 905. Memory 907 stores various data used by the projector including laser patterns for text and images to be projected. DAC 908 and ADC 909 provide data conversion between digital and analog domains. PMIC 903 manages the power and duty cycle of solid state laser 1904, including turning on and shutting off solid state laser 904 and adjusting the amount of power supplied to solid state laser 904. Solid state laser 904 can be, for example, a vertical-cavity surface-emitting laser (VCSEL).

In an embodiment, controller 901 uses image data from the camera/video subsystem 820 and/or depth data from the depth sensor(s) 814 to recognize and track user hand and/or finger positions on the laser projection, such that user input is received by the wearable multimedia device 101 using the laser projection as an input interface.

In another embodiment, the projector subsystem 832 uses a vector-graphic projection display and low-powered fixed MEMS micromirrors to conserve power. Because the projector subsystem 832 includes a depth sensor, the projected area can be masked when needed to prevent projecting on a finger/hand interacting with the laser projected image. In an embodiment, the depth sensor can also track gestures to control the input on another device (e.g., swiping through images on a TV screen, interacting with computers, smart speakers, etc.).

In other embodiments, Liquid Crystal on Silicon (LCoS or LCOS), Digital Light Processing (DLP) or Liquid Crystal Display (LCD) digital projection technology can be used instead of a pico-projector.

Example Virtual Interfaces

As described above, a wearable multimedia device 101 can include a projector subsystem 832 configured to present information visually to a user in the form of projected light. For example, the projector subsystem 832 can project light onto a surface (e.g., a surface of a user's hand, such as the user's palm) according to a particular spatial and/or temporal pattern, such that the user perceives a VI with one or more user interface elements. In some implementations, a VI and/or the user interface elements can include any combination of text, images, videos, colors, patterns, shapes, lines, or any other graphical information.

Further, the user can perform gestures to interact with the VI. For instance, the user can perform one or more gestures directed at one or more of the user interface elements. As examples, the user can point to a user interface element, touch or tap a user interface element using her finger (e.g., a single time, or multiple times in a sequence), perform a swiping motion along a user interface element using her finger, wave at a user interface element using her hand, hover over the user interface element, or perform any other hand or finger gesture. The wearable multimedia device 101 can detect the performed gestures using one or more sensors (e.g., the camera/video subsystems 820, environment sensor(s) 817, depth sensor(s) 814, etc.), identify one or more commands associated with those gestures, and execute the identified commands (e.g., using the processor(s) 804).

At least some of the user interface elements and/or commands can be used to control the operation of the wearable multimedia device 101. For example, at least some of the user interface elements and/or commands can be used to execute or control the generation of video and/or audio content, the viewing of content, the editing of content, the storing and transmission data, and/or any other operation described herein. In some implementations, a wearable multimedia device 101 can present a VI that allows a user to compose and send a message to one or more other users. This VI may also be referred to as a message composition interface.

Figure 10:
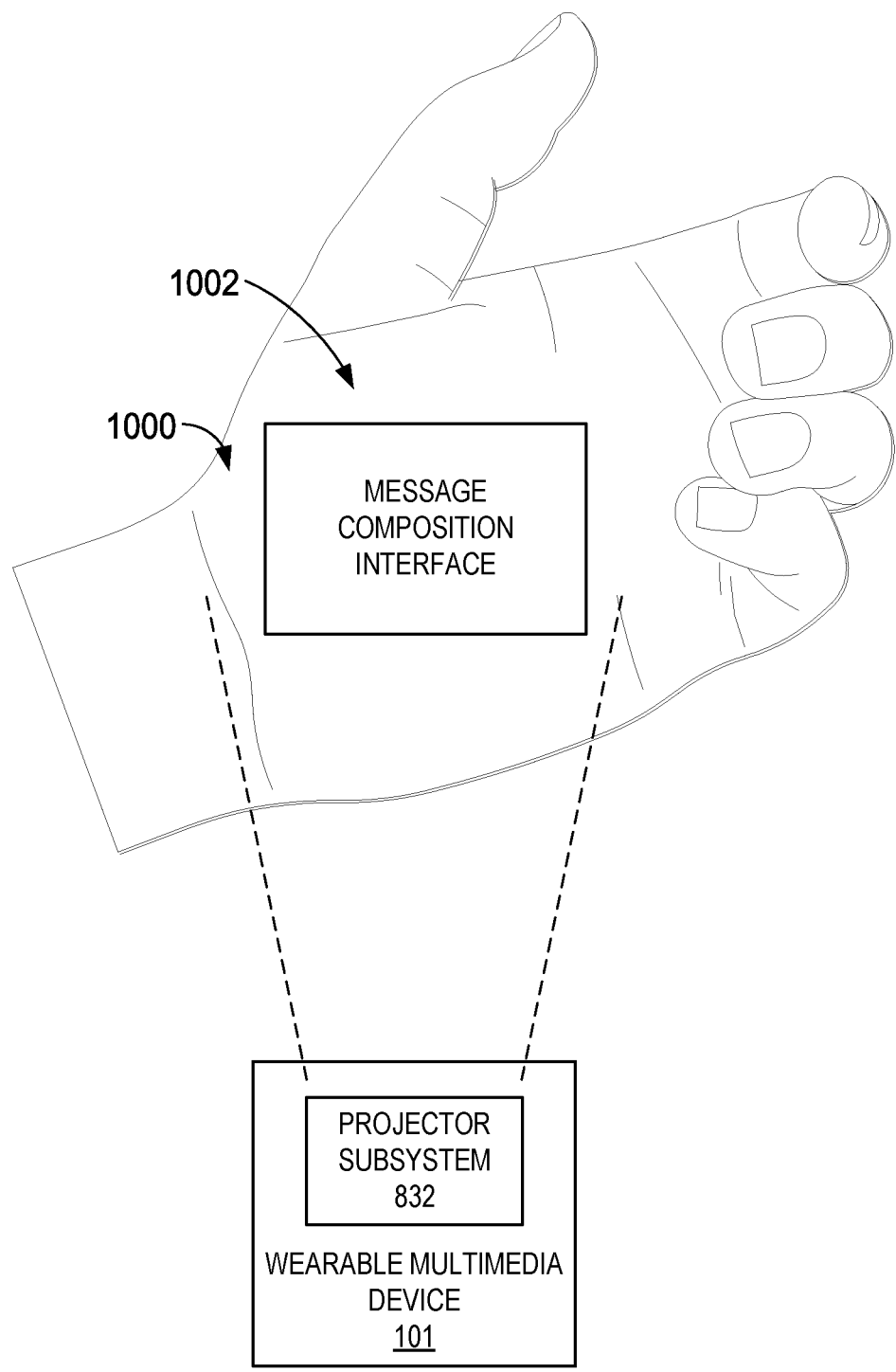
FIG. 10 is a diagram of an example virtual interface, according to an embodiment.

As an illustrative example, FIG. 10 shows a message composition interface 1000 projected by a projector subsystem 832 onto a user's palm 1002. The user can interact with the message composition interface 1000 to compose one or more messages. For example, the messages can include a user query composed in a natural language requesting for data that corresponds to the user query from a database. The natural language, for example, can be a human language such as English, Chinese, French, Spanish, Hindi, or other human languages, or a dialect of a language such as Mandarin or Cantonese in Chinese.

The database can be similar to the database 106 of FIG. 1, and stored on a server/cloud. Alternatively, or in addition, the database can be stored at least in part on a memory unit of the wearable multimedia device. The composed user query can be provided to the wearable multimedia device, or the server for processing the user query and providing data that corresponds to the user query.

In some implementations, the message composition interface 1000 can be used to compose and transmit text messages, emails, chat messages, and/or any other type of electronic message.

In some implementations, the message composition interface 1000 can be configured to receive first user input specifying the recipient (e.g., another user) of the message and the contents of the message, and second user input specifying a particular application and/or service for transmitting the message. Further, the message composition interface can be configured to receive the first user input (e.g., specifying the recipient and the contents of the message) prior to receiving the second user input (e.g., specifying the application and/or service for transmitting the message).

As an example, the message composition interface 1000 can include a composition UI element for receiving the recipient of the message, and text, images, video, and/or other content for inclusion in the message. For example, the message composition interface 1000 can represent data fetched from a database that corresponds to a user query. The fetched data can be represented on the message composition interface 1000 in the same human language as the user query, even when the fetched data is stored in the database and represented in a different language than the user query language. Alternatively, or additionally, in some cases, the fetched data can be represented on the message composition interface 1000 in a language different from the human language of the user query, and/or different from the language using which the data is stored in the database. This can be the case, for example, when the user query requests the results in a different language (e.g., for a translation).

Further, the message composition interface 1000 can present one or more selectable options, each corresponding to a different available application and/or service for sending the message. Using the composition UI element, the user can initially specify the recipient of the message and provide text, images, video, and/or other content for inclusion in the message. Subsequently, the user can select a particular application and/or service for sending the message.

The implementations described herein can provide various technical benefits. For instance, the message composition interfaces can allow a user to compose and transmit messages using the wearable multimedia device 101 in a more intuitive manner. As an example, when a user wishes to send a message to another user, the user may often be focused on the recipient of the message and the contents of the message, rather than the application and/or services that she wishes to use to transmit the message. The message composition interfaces allow the user to specify the recipient and the contents of the message first (e.g., prior to specifying the application and/or services that she wishes to use to transmit the message), such that the user is less likely to lose her train of thought or become distracted. Accordingly, the user is less likely to make mistakes in interacting with the wearable multimedia device 101.

Further, by reducing the occurrence of erroneous and/or unintended input by the user, the message composition interfaces can reduce the resources expended by the wearable multimedia device 101 during operation. For instance, if a user provides erroneous and/or unintended input to the wearable multimedia device 101, the wearable multimedia device 101 may perform certain operations unnecessarily (e.g., contrary to the user's intentions). Further, the user may spend more time interacting with the wearable multimedia device 101 to correct or reverse erroneous inputs. Accordingly, the wearable multimedia device 101 may expend resources-such as computational resources (e.g., CPU cycles), memory resources, storage resources, network resources, and/or battery resources—that might otherwise not need to be expended. By reducing the likelihood of user error in interacting with the VI, the wearable multimedia device 101 can reduce the expenditure of resources in correcting or reversing those errors. Accordingly, the wearable multimedia device 101 can operate in a more efficient manner.

Figure 11:
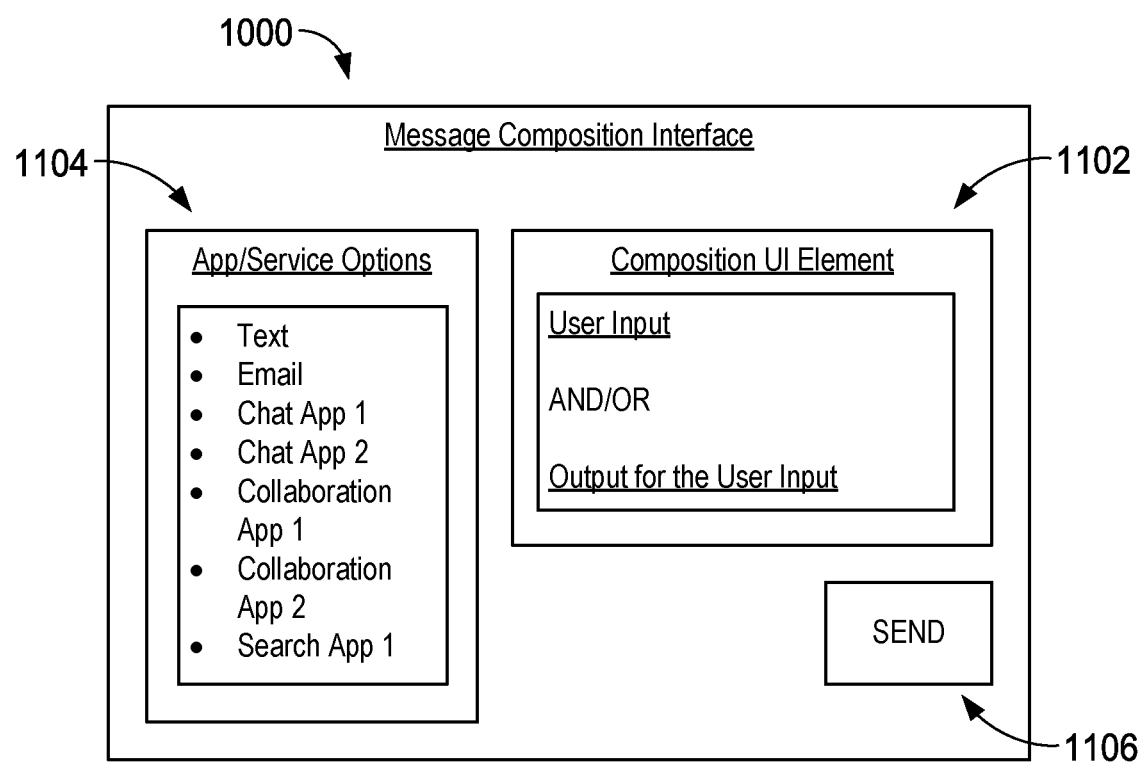
FIG. 11 is a diagram of an example message composition interface.

An example message composition interface 1000 is shown in greater detail in FIG. 11. The message composition interface 1000 includes a first UI element 1102 (also referred to as a composition UI element 1102), a second UI element 1104 (also referred to as an option selection UI element 1104), and a send button 1106.

The composition UI element 1102 is configured to present a message under composition. As an example, the composition UI element 1102 can indicate a user input and/or an output corresponding to the user input. The user input can indicate a message under composition relates to a user query. The indication can be made by keywords composed by a user. The keywords can be "user query," "search," or "query," at a particular position relative to the body of a message. For example, the keywords can be located at the beginning of the message or immediately after a symbolic character (e.g., #, @, or %) The wearable multimedia device 101 or the server (e.g., ingestion server 205) can determine that the composed message is a user query. Alternatively, a user can select one or more buttons on the message composition interface 1000 to indicate that the to-be-composed message is a user query.

The composition UI element 1102 can indicate the contents of the message. For instance, the composition UI element 1102 can indicate text, images, videos, audio, or any other content for inclusion in the message.

In some implementations, the user can provide user input via an external device, such as a keyboard, a mouse, and/or a touch sensitive display, wired or wirelessly coupled to the wearable multimedia device 101. In some implementations, the user can provide user input by performing one or more gestures that are detected and interpreted by the wearable multimedia device 101 (e.g., using the camera/video subsystem 820, depth sensor(s) 814, etc.). In some implementations, the user can provide user input through spoken commands that are detected and interpreted by the wearable multimedia device 101 (e.g., using the microphones 830 and a speech recognition engine).

The option selection UI element 1104 is configured to present one or more applications and/or services that can be selected by the user for requesting data using a user query. In some implementations, the applications and/or services can include a search app (e.g., an application or service for searching data in a database). In addition, the applications can include text messaging applications or services (e.g., an application or service that exchanges messages using Short Message Service (SMS) and/or Rich Communication Service (RCS)). In some implementations, the applications and/or services can include an email application or service (e.g., Outlook→, Microsoft Exchange→, Google→Mail, iCloud Mail→, etc.). In some implementations, the applications and/or services can include a chat or instant messaging application or service (e.g., Signal→, Telegram→, WhatsApp→, Facebook Messenger→, applications or services utilizing Extensible Messaging and Presence Protocol (XMPP), etc.). In some implementations, the applications and/or services can include a collaboration application or service (e.g., Slack, Microsoft Teams, Discord, etc.). In some implementations, the applications and/or services can include a social media application or service (e.g., Facebook, Twitter, Instagram, etc.).

In some implementations, the user can make a selection from the option selection UI element 1104 via an external device, such as a keyboard, a mouse, and/or a touch sensitive display, wired or wirelessly coupled to the wearable multimedia device 101. In some implementations, the user can make a selection by performing one or more gestures that are detected and interpreted by the wearable multimedia device 101 (e.g., using the camera/video subsystem 820, depth sensor(s) 814, etc.). In some implementations, the user can make a selection through spoken commands that are detected and interpreted by the wearable multimedia device 101 (e.g., using the microphones 830 and a speech recognition engine).

In some implementations, the wearable multimedia device 101 can determine which of the applications and/or services can be used to transmit a user query to the server, and selectively indicate those applications and/or services to the user via the option selection UI element 1104 (e.g., by visually emphasizing those applications and/or services in the option selection UI element 1104). The remaining applications and/or services can be visually deemphasized in the option selection UI element 1104, or omitted from the option selection UI element 1104 entirely. This can be beneficial, for example, in reducing input errors from the user.

In some implementations, the user can manually instruct the wearable multimedia device 101 to transmit a user query to a server (e.g., by selecting the send button 1106, performing a particular gesture, providing a particular spoken command, etc.). The wearable multimedia device 101 can transmit the message to the server in response to receiving the user's instructions.

In some implementations, the wearable multimedia device 101 can automatically transmit the user query in response to the user selecting an application and/or service from the option selection window 1104.

As described above, the message composition interface 1000 can be configured to receive first user input specifying a user query represented in a natural language (e.g., via the composition UI element 1102). Subsequently, the message composition interface 1000 can receive and present a message corresponding to data that is fetched for the user query. An example of this process is shown in FIGS. 12A-12D.

Figure 12A:
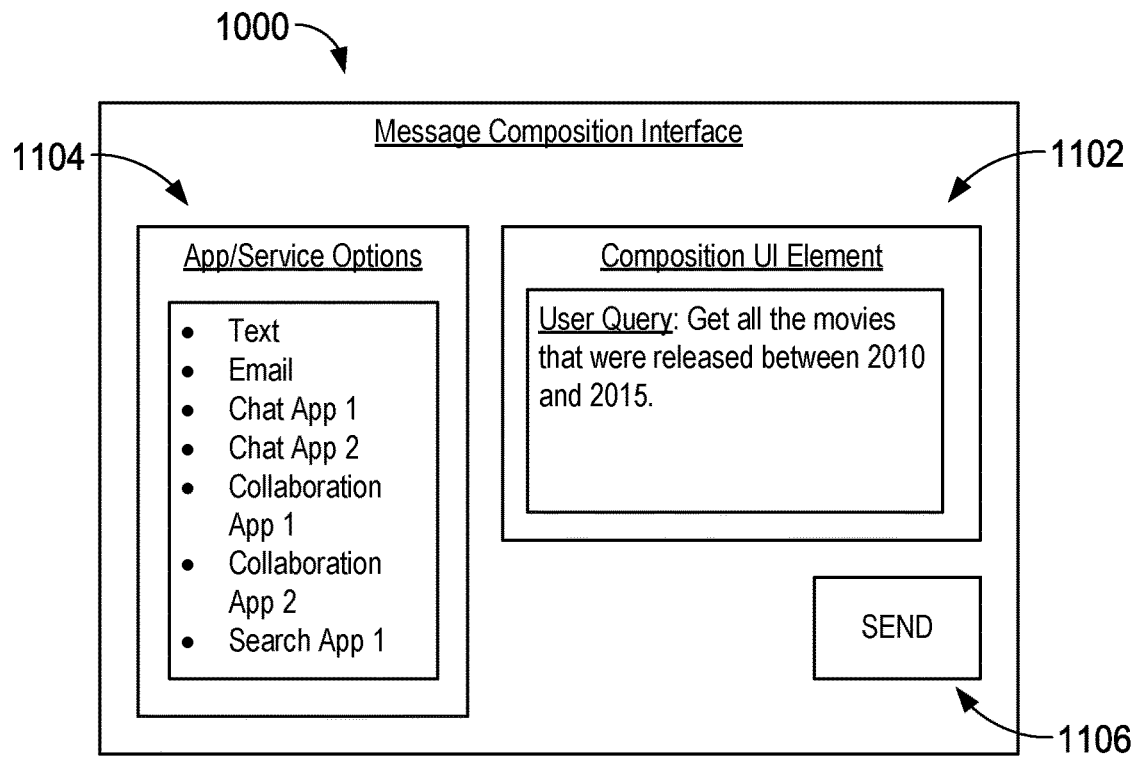
FIGS. 12A-12D are diagrams of example operations relating to a message composition interface.

As shown, in FIG. 12A, the wearable multimedia device 101 presents the message composition interface 1000 to a user. In some implementations, the message composition interface 1000 can be a VI that is presented, at least in part, using a projector subsystem 832. As discussed above, the message composition interface 1000 includes a composition window 1102 for presenting a message under composition, and an option selection UI element 1104 for presenting one or more applications and/or services that can be selected by the user to transmit the message (e.g., to a server or to another user).

In this example, the composition UI element 1102 includes a blank or empty portion for inputting the contents of the user query. The content of the user query can be composed in a natural language, e.g., English, and can correspond to a request or a question. For example, the user query can be "Get all the movies that were released between 2010 and 2015," as shown in FIG. 12A.

The option selection UI element 1104 presents a search application in several applications and/or services for transmitting the user query. In this example, each of the applications and/or services are presented according to a similar visual appearance or style (e.g., such that one application and/or service is not visually emphasized over another).

The wearable multimedia device 101 can modify the appearance of the option selection UI element 1104 based on the user's input in the composition UI element 1102. For instance, as described above, the wearable multimedia device 101 can determine which of the applications and/or services can be used to query for information from a database, and selectively indicate those applications and/or services to the user via the option selection UI element.

Figure 12B:
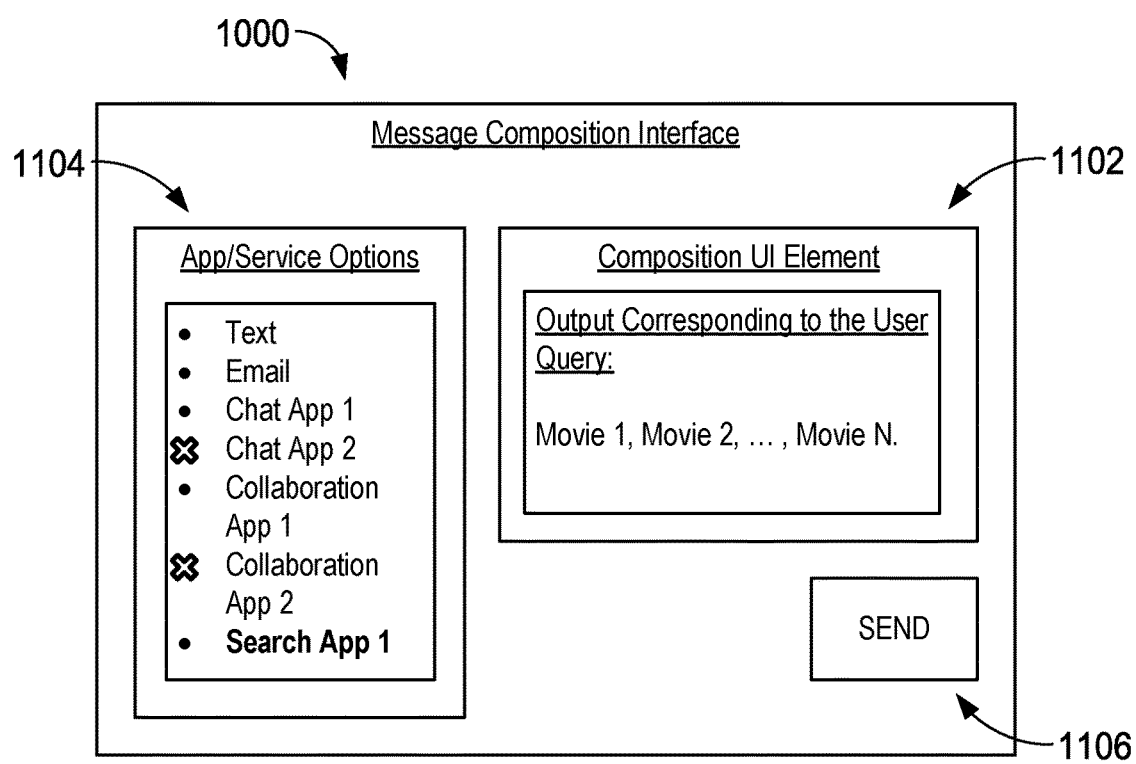

As an example, the wearable multimedia device 101 can visually emphasize one or more applications that are suitable for performing a user search based on a user query (e.g., by presenting these applications and/or services using a bolded font). As shown in FIG. 12B, the wearable multimedia device 101 highlights the search application 1 in the option selection UI element 1104, indicating that the search application 1 can be selected for transmitting a user query for performing a search in a database. In addition or alternatively, the wearable multimedia device 101 can indicate applications and/or services are unavailable or not suitable for performing a user search or processing a user query by using an "X" icon.

Figure 12C:
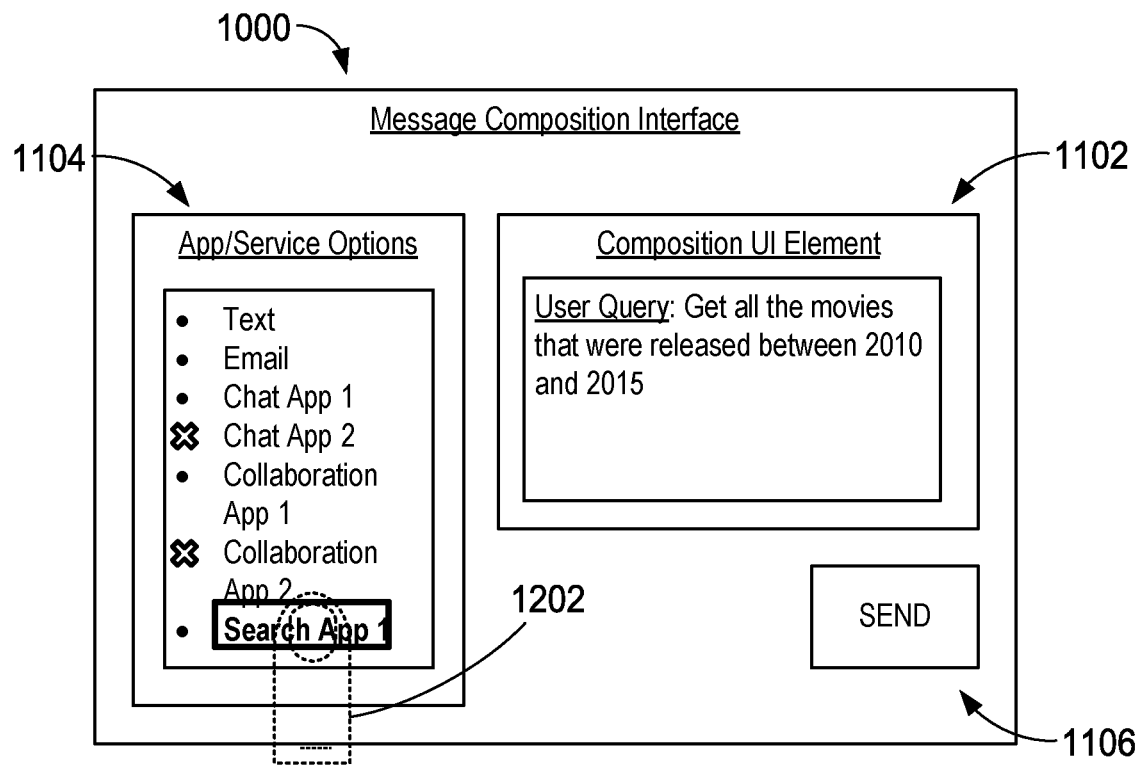

The user can use the option selection UI element 1104 to select one of the applications and/or services for processing the user query. For example, as shown in FIG. 12C, the user can align this finger 1202 with one of the applications and/or services (e.g., "Chat App 1"), and indicate her selection (e.g., by tapping or pressing or hovering over the surface upon which the message composition interface 1000 is projected). In some implementations, the user's selection can be visually indicated in the option selection UI element 1104 (e.g., using a border or outline around the selected application and/or service).

Figure 12D:
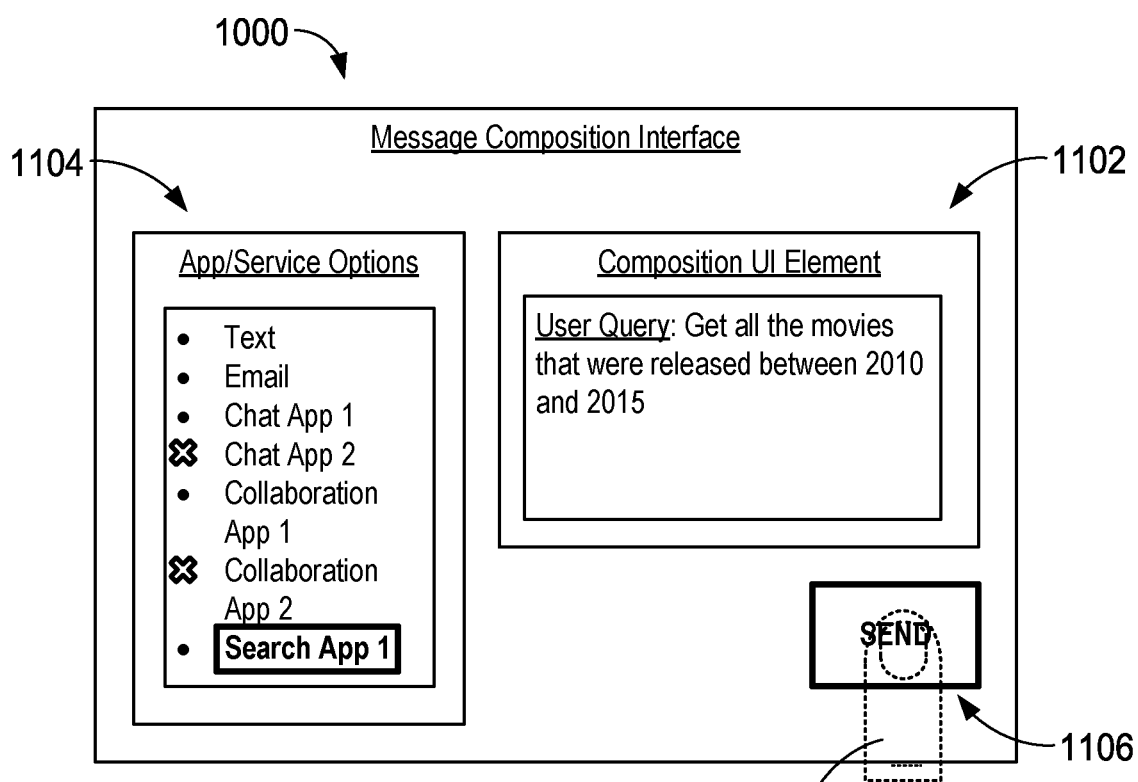

As described, in some implementations, the user can manually instruct the wearable multimedia device 101 to transmit the user query to a server. For example, as shown in FIG. 12D, the user can select the send button 1106 (e.g., by aligning her finger 1202 with the send button 1106, and tapping or pressing the surface upon which the message composition interface 1000 is projected). The wearable multimedia device 101 can transmit the user query to a server in response to receiving the user's instructions.

Further, in some implementations, the wearable multimedia device 101 can automatically transmit the user query to a server in response to the user selecting an application and/or service from the option selection UI element 1104. Accordingly, the user need not manually select the send button 1106 to instruct the wearable multimedia device 101 to send the message.

In response, the composition UI element 1102 can represent a message corresponding to a user query. The message can be generated based on the data fetched for the user query from a database and represented in the same natural language as the user query. For example and as shown in FIG. 12B, the composition UI element 1102 can represent an output corresponding to the user query for movies released between 2010 and 2015, where the output can read as "Movie 1, Movie 2, . . . , Movie N," according to the corresponding data stored in the database.

Although FIGS. 12A-12D show example operations by the wearable multimedia device 101, these are merely illustrative examples. In practice, other operations can be performed by wearable multimedia devices to present a message composition interface, either instead or in addition to those shown in FIGS. 12A-12D.

As an example, FIG. 12B shows modifications to the option selection UI interface 1104, using which certain application and/or services are visually emphasized using a bold font, and other applications and/or services are visually deemphasized using a non-bold font and a represented icon (e.g., a "X" icon). However, as described above, in some implementations the option selection UI interface 1104 can be modified by changing the order in which the applications and/or services are presented. For example, the applications and/or services can be ordered and re-ordered based on at least one of (i) the relevance of the application and/or service to the user input in the composition UI element 1102, (i) the presence information for each application and/or service, or (ii) historical data regarding previous activities.

As another example, as described above, the option selection UI interface 1104 can be modified by filtering the applications and/or services, such that certain applications and/or services are omitted from the option selection UI interface 1104 entirety. For example, the applications and/or services can be filtered based on (i) whether the application and/or service is relevant to the composed message presented in the composition UI element, (ii) the presence information for each application and/or service, or (iii) historical data regarding previous activities.

Example Query Processing System

Figure 13:
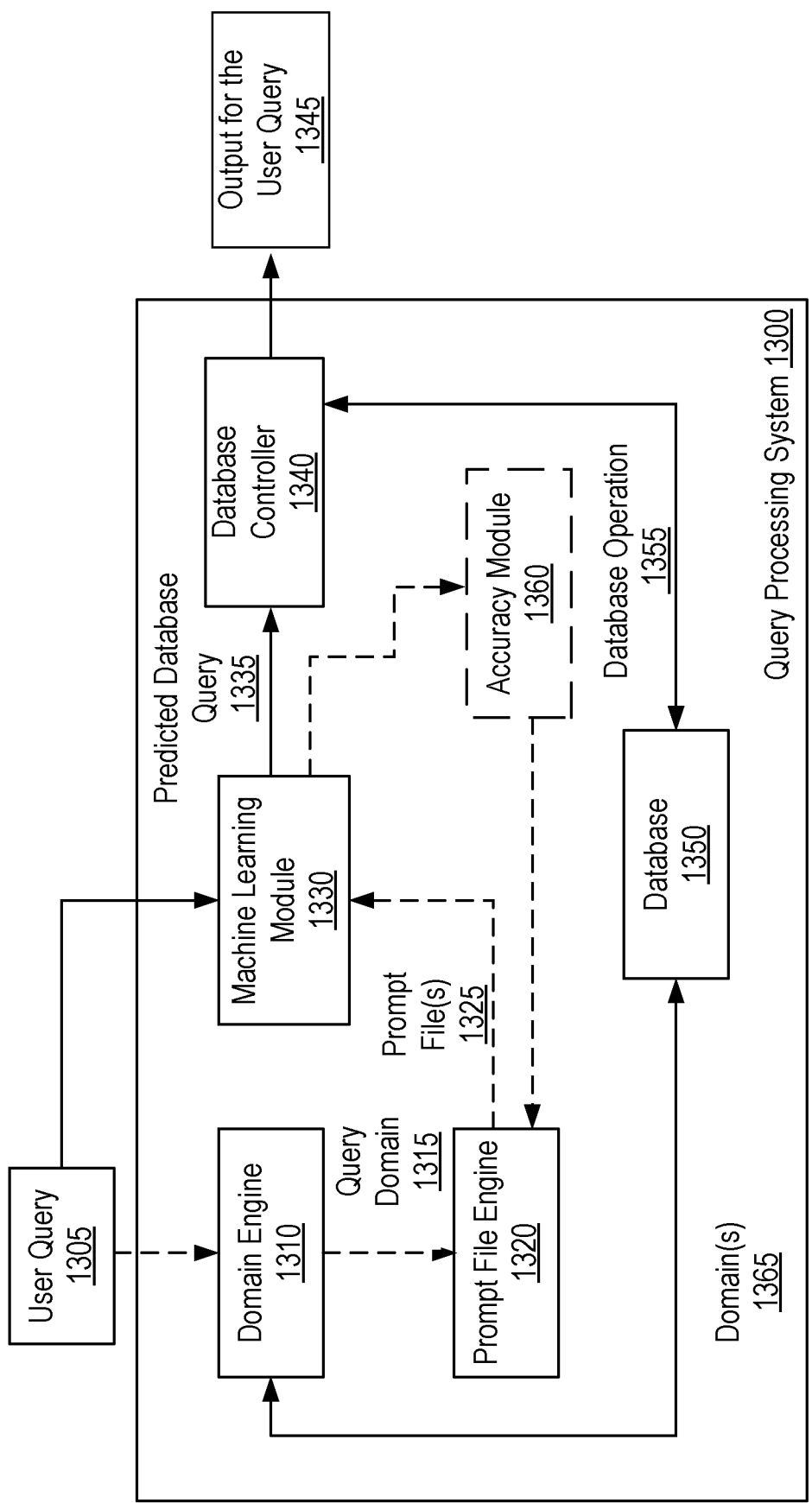
FIG. 13 is an example query processing system.

FIG. 13 illustrates an example query processing system 1300. The query processing system 1300 can be implemented by one or more computers or devices located at one or more locations. For example, in some cases, the query processing system 1300 is implemented on a cloud computing platform (e.g., cloud computing platform 102 of FIG. 1), e.g., using one or more servers (e.g., similar to the server architecture 700 of FIG. 7). In some cases, the query processing system 1300 is implemented on a wearable multimedia device 101. In some cases, the query processing system 1300 is implemented partly on a cloud computing platform and partly on a wearable multimedia device 101, working in conjunction.

As shown in FIG. 13, the query processing system 1300 is configured to receive a user query 1305 and generate an output 1345 corresponding to the user query. As described above, the user query 1305 can be transmitted from a user interface (e.g., message composition interface 1000 of FIGS. 11, and 12A-D) of a wearable multimedia device (e.g., one of the wearable multimedia devices 101 of FIG. 1). The user query 1305 is generally represented in a natural language, e.g., a particular human language such as English, Chinese, French, or other human languages. The output 1345 for the user query can be generated based on data corresponding to the user query stored in a database (e.g., the database 106 of FIG. 1). The output 1345 can be generated in the same natural language as the user query and be transmitted to the wearable multimedia device for display on the user interface.

The way of providing data in a database corresponding to the user query is efficient because the user query 1305 does not have to be composed according to a particular fashion or following a particular syntax. Rather, a user query 1305 that generally makes sense in a particular natural language can be processed by the system 1300 for providing a corresponding output data. The described techniques are advantageous because it provides a user more flexibility for composing a query (compared to directly composing a query in a database language, e.g., SQL or OpenCypher). In addition, the system 1300 can generate accurate output corresponding to the user query, because the system 1300 can, using a machine learning model, accurately "understand" the flexibly-composed user query and "translate" the user query from a natural language into a corresponding database language for fetching data relevant to the user query.

To generate an output 1345 for a user query 1305, the query processing system 1300 can receive the user query 1305 and determine a domain 1365 (e.g., a domain of knowledge) for the user query 1305 as the query domain 1315 using a domain engine 1310. In general, the domain engine 1310 can first determine multiple domains 1365 for a database, and then determine a particular domain that is relevant to the user query 1305 as a query domain 1315.

For example, a database can include different information that relates to different topics or knowledge, e.g., music, movies, arts, books, sports, history, or other suitable topics. The domain engine 1310 can be configured to determine a first domain for topics or knowledge relevant to music, a second domain for topics or knowledge relevant to movies, or another domain for a different topic or knowledge. One example of determining different domains 1365 in a database can include techniques such as generating feature vectors for different data, and clustering or aggregating different feature vectors for different data by comparing a level of similarity between two different feature vectors in a feature space. The feature vectors can be generated using different techniques, such as using tokenization, embedding, or encoders, to name just a few examples. The clustering or aggregating process can be performed using various techniques, such as Okapi best matching (BM) 25, K nearest neighbors (KNN), K-Means, support vector machines (SVMs), masking neural networks, or other suitable techniques. The system can generate a domain feature vector for a particular domain. For example, the domain feature vector for a domain can be represented by a mean value of all feature vectors of data in that domain, or a weighted sum of all feature vectors of data in that domain.

To generate a query domain 1315 for the user query 1305, the domain engine 1310 can first generate a query feature vector for the user query, determine a query domain by comparing the query feature vector with each of the domain feature vector, and assign the user query 1305 to a particular domain based on comparison. In some implementations, the comparison can be based on a level of similarity. For example, a user query of "getting a movie released in 2010" can have a higher level of similarity to a "movie" domain than a "music" domain, and accordingly the user query can be assigned, as the query domain 1315, the "movie" domain by the domain engine 1310. The techniques for determining a query domain 1315 can include Okapi BM 25, KNN, or other suitable methods. Taking the KNN method as an example, the domain engine query domain for a user query can be determined based on respective votes from each of K neighbor feature vectors in a vector space, where K is an integer specifying a number of neighbor feature vectors.

The system 1300 can include a prompt file engine 1320 configured to generate one or more prompt files 1325 for the user query 1305. A prompt file 1325 can be generated based on the query domain for the user query 1305. The prompt file can include one or more pairs of example queries. Each pair of example queries can include a first query composed in a natural language (e.g., a human language such as English), and a second query represented in a database language (e.g., OpenCypher or SQL) that corresponds to the first query. For each pair of example queries, a second query can be considered as a benchmark output generated from a machine learning model for a first query in the pair. The system 1300 can provide the prompt file 1325 for the user query 1305 to a machine learning module 1330 for training or fine-tuning a machine learning model. In some implementations, the system 1300 can provide the user query 1305 to the machine learning module 1330 with the prompt file 1325 for generating a prediction for the user query 1305. The details of an example prompt file 1325 are described in connection with FIG. 14.

Note that the system 1300 can instruct the domain engine 1310 and prompt file engine 1320 to process the user query 1305 for training, fine-tuning, or prompting a pre-trained, machine learning model. In situations where a machine learning model has been trained, the query processing system 1300 can directly process the user query 1305 using the machine learning module 1330 or directly process the user query 1305 within one or more prompt files. The process of training a machine learning model in the system 1300 is described in greater detail in connection with FIG. 15. The process of performing inference operations using a trained machine learning model is described in greater detail in connection with FIG. 16.

In some implementations, the query processing system 1300 does not include a machine learning module 1330. Rather, the machine learning module 1330 is located or operated by a third party processor, system, server, or platform (e.g., third party platform 105 of FIG. 1). In these situations, a user query 1305, and optionally, the prompt file 132, can be transmitted, by one or more interfaces in the system 1300, to a machine learning module 1330 located on a third party server or processor.

The machine learning module 1330 can include a machine learning model configured to process a user query 1305 to generate a prediction for the user query. For example, the prediction can include a predicted database query 1335 represented in a database language corresponding to the user query 1305. The machine learning model can include any suitable machine learning models, e.g., a unidirectional RNN, a bi-directional RNN, a LSTM model, transformers, or a third party general machine learning model (e.g., OpenAI Codex), or other suitable machine learning models.

During training the machine learning model in module 1330, the system can provide the predicted database query 1335 to an accuracy module 1360. The accuracy module 1350 can determine whether the predicted database query 1335 is accurate enough for a corresponding user query 1305. The determination can be based on a level of similarity between the predicted database query 1335 and a ground-truth data query for the user query 1305.

When the determined level of similarity satisfies a threshold level of accuracy, the system can provide the predicted database query 1335 to a database controller 1340 for fetching data that corresponds to the predicted database query 1336 (and thus the user query 1305). The system 1300 can generate an output 1345 based on the fetched data for the user query.

The threshold accuracy level can be determined based on different training requirements and/or different types of tasks. For example, if a task is related to providing medical information related to a user query, it may be desired to train the model with high accuracy. Accordingly, the threshold accuracy level can be to a high value, e.g., between 95% and 100%. As another example, if a task is related to providing book or music recommendation related to a user query, the model may be trained with a moderate level of accuracy. In such a case, the threshold accuracy level can be set to a moderate level, e.g., 50%.

When the determined level of similarity does not satisfy the threshold level of accuracy, the system 1300 (or the accuracy module 1360) can send a signal triggering the prompt file engine 1320 to generate additional example query pairs for training the machine learning model. The additional example query pairs are generally in the same structure or format as the existing example query pairs in the prompt file 1325. However, for each pair of the additional query pairs, at least one of the first query or the second query in the additional example query pair is different from the corresponding first query or second query in an existing query pair (so that there is no redundant example pair). For example, a first query in the existing query pair and a first query in an additional query pair can both read as "What is the movie that generates the highest revenue in 2020," and the second query in the existing query pair can read as "MATCH (m:Movie {m.released=2020, m.revenue=max}) RETURN m.Movie," which reads differently from the second query in the existing query pair, e.g., "MATCH(m: Movie) where m.released=2020→RANK(m.revenue)=1 RETURN m.Movie."

The training process can be performed based on an objective function (e.g., a zero-one loss, a hinge loss, or an entropy loss), which can be any suitable objective function that penalizes predicted database queries 1335 that does not satisfy a threshold level of accuracy. The system 1300 (or the machine learning module 1330 when it is located on a third party platform) can perform various techniques for enhancing the training process, e.g., normalization, batching or mini batching, different augmentations, various gradient descent methods (e.g., stochastics gradient descent, or synchronized gradient descent), and different optimizations techniques such as ADAM optimizer.

In some implementations, the system 1300 can determine a natural language for a user query 1305 and convert the user query 1305 into a language that is compatible for a machine learning model in the machine learning module 1330. For example, the system 1300 can determine that the user query 1305 is composed in English, and the machine learning model in the machine learning module 1330 is trained using training examples (e.g., example query pairs in the prompt file 1325) in a different natural language, say Chinese, the system 1300 can translate or convert the user query from a first language to the language that the machine learning model is trained for (e.g., translating the user query 1305 from English to Chinese) before providing the user query to the machine learning module 1330.

In some implementations, the system 1300 can determine a language that the fetched data is stored in a database, and generate, based on the fetched data, an output that is represented in a different language. For example, the output 1345 can be represented in the same language that the user query 1305 is represented. As another example, the output 1345 can be represented in the same language as the training examples for training a machine learning model in the machine learning module 1330.

Figure 14:
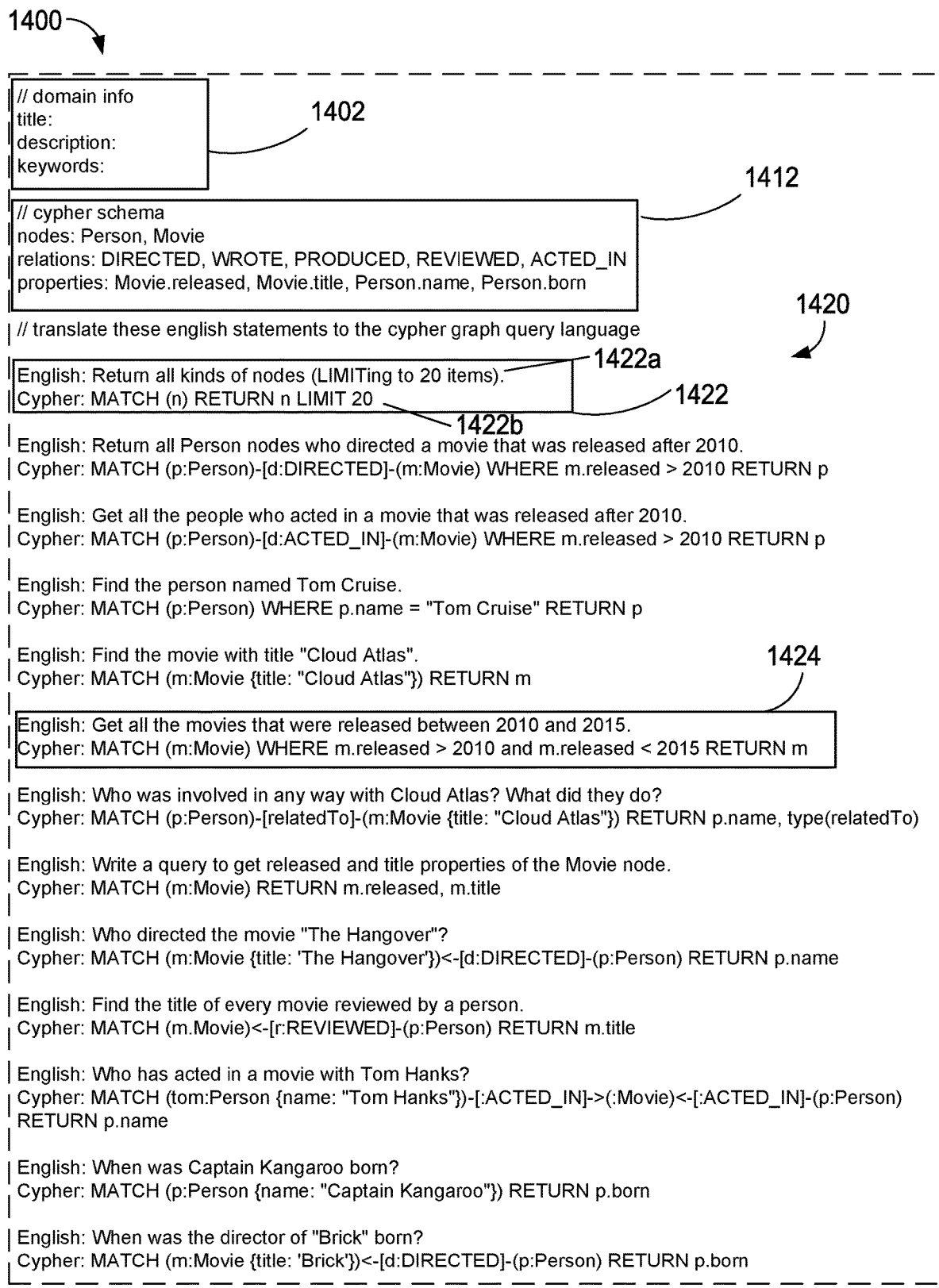
FIG. 14 is an example prompt file.

FIG. 14 is an example prompt file 1400. The example prompt file 1400 can be equivalent to the prompt file 1325 of FIG. 13. Although shown as pairs of natural language (e.g., English) and database language (e.g., Cypher), other prompt files may be used. For example, in situations where multiple databases requiring different query structures are used, the prompt file can include multiple Cyphers each corresponding to a natural language query. In some implementations, a single query is generated but chains data from multiple databases. For example, a trained model can generate a single query based on a prompt file and user query where the single query obtains data from one or more databases corresponding to the specific user query—e.g., some queries may require data from multiple databases and some queries may require data from only one database.

A prompt file can include multiple sections. For example, and as shown in FIG. 14, the prompt file 1400 can include a first section 1402 indicating a domain for the prompt file 1400. As described above, the system 1300 can determine a domain as a query domain for a user query, and generate, based on the query domain, a prompt file 1400 for the user query in the query domain. The domain information in the prompt file 1400 can be used to determine a machine learning model for processing the prompt file 1400. For example, if the domain relates to movies, the query processing system 1300 can select a machine learning model that is specially designed for processing movie-related data.

The first section 1402 in the prompt file 1400 can include at least one of a title for the domain, a description for the domain, or one or more keywords specified for the domain. For example, the tile for the domain can include "movies," "books," "music," or other titles. The description for the domain can include "movie and actor graph," "movie and director graph," "movie, actor, and director graph," or other descriptions. The keywords can include one or more of "movies," "actors," "directors," "plots," "bibliographic information" or other suitable keywords.

The prompt file 1400 can include a second section 1414 representing a database schema, i.e., metadata defining input fields and acceptable input values for the input fields. The input fields can include, for example, nodes (e.g., a person, a movie) and data associated with the nodes, relations (e.g., directed, wrote, produced, reviewed, acted in) between nodes, and properties (e.g., Movie.released, Movie.title, Person.name, Person.born) associated with the nodes. The acceptable input values can include different values of different data types, e.g., integers, floating point values, strings, or other suitable data types. The schema can be specified in a particular database language, e.g., OpenCypher or SQL.

The prompt file 1400 can further include a third section 1420 including one or more example query pairs. For example, the third second 1420 can include a first example query pair 1422 and a second example query pair 1424. Each pair of the example query pairs can include a first query represented in a natural language, and a second query corresponding to the first query that is represented in a database language. For example, the first example query pair 1422 can include a first query 1422*a* represented in English, which reads as "Return all kinds of nodes (LIMITing to 20 items)," and a second query 1422*b* that corresponds to the first query 1422*a* represented in a database language (e.g., in OpenCypher), which reads as "MATCH (n) RETURN n LIMIT 20." Similarly, the second example query pair 1424 can include a first query in English reading as "Get all the movies that were released between 2010 and 2015," and a second query in Cypher corresponding to the first query and reading as "MATCH (m:Movie) WHERE m.released>2010 and m.released<2015 RETURN m."

Note that the first query in each example can be selected based on different requirements for processing a user query. For example, the first query can be represented in English, Chinese, French, Hindi, or other human languages. The second query can be represented in a different database language for a different database. The system 1300 or a user can determine a database language for the database and the prompt files. Moreover, it should be appreciated that the example queries are presented for illustration, other implementations for composing the first and second queries in the prompt file can be determined according to particular training requirements.

Figure 15:
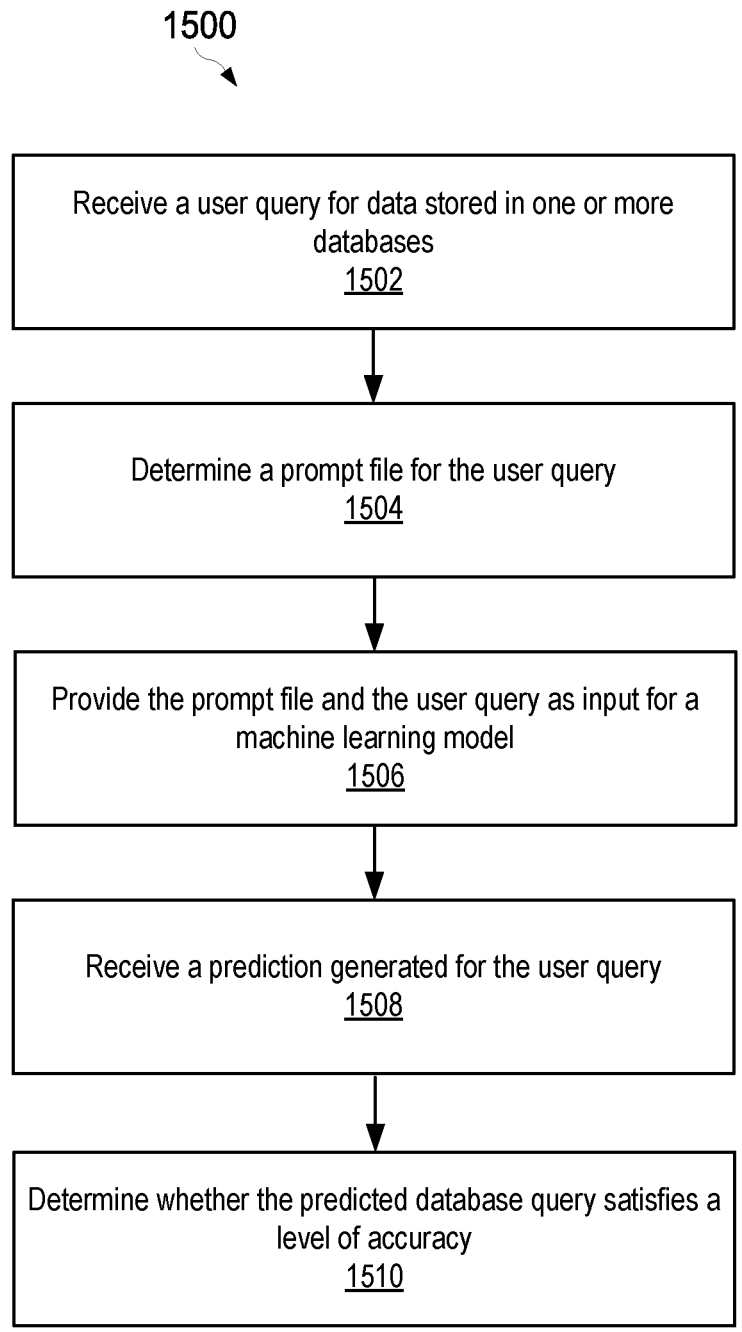
FIG. 15 is a flow diagram of an example process for training a machine learning model.

FIG. 15 is a flow diagram of an example process 1500 for using a machine learning model. In some implementations, the process 1500 includes training a machine learning model prior to providing prompt data for the resulting trained machine learning model. The process 1500 can be performed by a system of one or more computers located in one or more locations. For example, a query processing system 1300 of FIG. 13, appropriately programmed, can perform the process 1500.

For training a machine learning model configured to provide data corresponding to a user query, the system receives a user query for data stored in one or more databases (1502). The query can be composed in a user interface (e.g., message composition interface 1000 of FIGS. 11 and 12A-D) of a wearable multimedia device (e.g., a wearable multimedia device 101 of FIG. 1). The user query can be represented or composed in a natural language, for example, English, Chinese, French, or any other suitable human language. An example query can include an identification of a song—e.g., genre, artist, among others. Various metadata for the song can be stored in one or more databases—e.g., past songs listened to by a user stored in a first database, genre and metadata for songs stored in a second database, among others.

The system determines a prompt file for the user query (1504). As described above, a prompt file can include one or more example query pairs. Each example query pair can include a first query represented in a natural language, and a second query corresponding to the first query and represented in a database language. In some implementations, the system can determine that a received user query is represented in a natural language that is different from the natural language for the first query. In response, the system can translate or convert the received user query into the same natural language as the first query in the prompt file. For example, the user query is represented in Chinese, and the first queries in the example query pairs are presented in English. The system can translate the user query from Chinese into English before processing the user query using a machine learning model. In some implementations, the system can include a generative language model for converting user queries between different natural languages. The example query pairs are described above in greater detail in connection with FIG. 14.

In some implementations, a prompt file includes multiple queries of either a natural language or a database language. For example, by providing multiple database languages, the prompt file can be used to train a model to generate database queries for multiple different databases which may use different query structures. A prompt file can include multiple database languages associated with a single natural language query. A prompt file with multiple database languages can be used to inform output of a previously trained model to output not just one, but multiple—corresponding to the number of multiple database languages—database queries for a given user query provided with the prompt file.

In some implementations, a machine learning model generates a database query configured to obtain data from multiple databases. For example, a query can indicate database chaining where data is obtained from one database to then be used in a query for another database. In some implementations, a machine learning model is trained to use chained queries to generate database queries for particular types of user queries. For example, determining date ranges for when a song was played on a device—corresponding to a query, e.g., "how many times was this song played?"—may involve a query to obtain data from a single database, depending on implementations of databases storing the relevant data. In contrast, different types of queries may require data from multiple databases, such as identifying the most common genre of songs played in the last month—e.g., requiring a generated database query for the songs played in the last month and a different generated database query for the genres of those songs to be used by a processing element (e.g., the system 1300 of FIG. 13) to provide output in response to the user query.

In addition, the system can determine a prompt file for a user query according to domain information. For example, the system can group different data into different domains of knowledge and select a domain from the multiple domains as a query domain for the user query. The system can determine a prompt file based on the query domain. For example, the system can generate multiple example query pairs based on data or information related to the query domain.

In some implementations, a prompt file includes correct examples. For example, a prompt file can include one or more associated queries illustrating a correct database query for one or more natural language queries (see FIG. 14 and related description). The correct database query can be generated by a user of the system or programmed by a system administrator.

The system provides the prompt file and the user query as input for a machine learning model (1506). The machine learning model is configured to generate a prediction for the user query. In some implementations, the machine learning model is previously trained to generate predictions using a provided prompt file and user query. For example, the prompt file combined with the user query can be provided as input to inform the type of prediction considered correct for the user query. The trained machine learning model can predict a correct database query for the user query based on features of the prompt file. In general, the trained machine learning model can include a natural language model that predicts a likely database query for the user query given the set of queries provided in the prompt file.

In some implementations, the example query pairs in the prompt file are provided to the machine learning model as training samples. The training process can include updating model parameters of the machine learning model for processing the training examples. Some example techniques for training the machine learning model are described above.

In some implementations, generating a trained model using a prompt file increases accuracy and reduces computational expenditure to generate output. For example, a prompt file can be used in conjunction with a user query to help improve the response to the user query. A prompt file can also be used to train a separate model—e.g., a specialized version of a general natural language model. The separately trained model can be used for specific types of queries—e.g., included in the prompt file. The prompt file can include tens, hundreds, thousands, or more query examples to help train the model. In some implementations, training a model is helpful for specific applications of a database query model—e.g., operating on satellite devices or low bandwidth servers or specialized high bandwidth use cases where similar queries are frequently being requested.

In some implementations, the disclosed techniques for using a machine learning model trained using a prompt file increases efficiency in data exchange for user querying and response. For example, because a model can be pre-trained with a prompt file, a user can simply provide a user query without a corresponding prompt file. In some implementations, the prompt file is large—e.g., multiple megabytes or gigabytes. By not sending the prompt file, data exchange bandwidth requirements for providing a query and generating a database query in response are reduced—e.g., less data needs to be exchanged between a requesting user and a computing system operating the model pre-trained with the prompt file compared to a general trained model provided both the user query and prompt file for each user query.

The machine learning model can be included in a machine learning module that is included in the system or external to the system. As described above, the machine learning module can be located or operated by a third-party platform, and the system includes respective interfaces for transmitting the prompt file and user query for use with or training a machine learning model external to the system.

The system receives a prediction generated for the user query (1508). The prediction can include a predicted database query represented in the database language corresponding to the user query. The predicted database query can have the same data structure as the second queries in the example query pairs or third, fourth, fifth, or other queries corresponding to one or more provided natural language queries.

The system determines whether the predicted database query, based on a ground-truth database query for the user query, satisfies a threshold level of accuracy (1510). To determine, the system can generate a level of accuracy by comparing the predicted database query with the ground-truth database query, and determine whether the level of accuracy satisfies a threshold level of accuracy. The level of accuracy can be a similarity measure between the predicted database query and the ground-truth database query. For example, the similarity measure can be a normalized distance value ranging from zero to one, where zero represents the least similarity and one represents the maximum similarity (i.e., substantially the same). The similarity measure can be calculated by the system based on feature vectors of the database queries projected on a feature space. More specially, the system can determine a distance between two feature vectors representing the predicted database query and the ground-truth data query respectively, and generate a similarity measure based on the distance. For example, the distance can be a Euler distance in the feature space.

In response to determining that the predicted database query does not satisfy the threshold level of accuracy, the system can update the prompt file by generating an additional example query pair for the query domain. The additional pair of example query can include a new first query represented in the same natural language as other existing first queries, and a new second query represented in the same database language as other existing second queries. At least one of the new first query or the new second query in the additional example query pair is different from corresponding first queries or second queries that are in the original prompt file. The system can then provide the updated prompt file with the additional example query pair and existing query pairs, and optionally the user query, to adjust output of the machine learning model or for further training the machine learning model.

In response to determining that the predicted database query satisfies the threshold level of accuracy, the system can determine that the machine learning model is successfully trained. The system can provide the predicted database query for fetching data from a database for the user query.

In addition, the system can receive a new user query for data stored in the database. The user query can be represented in the same natural language as the first queries. The system can provide the new user query to the trained machine learning model for generating a prediction for the new user query. The system can receive the prediction generated for the new user query from the machine learning model. The prediction includes a predicted database query represented in the database language corresponding to the new user query. The system can fetch data from the database that corresponds to the predicted database query; and generate an output based on the fetched data for the new user query. In some implementations, the new user query is provided with the prompt file, or new prompt file—e.g., where the model is not trained using the prompt file but the prompt file is used to improve the output of a generally trained language model providing output in response to the user query. For example, the new user query can be provided with the prompt file, or new prompt file, as a single item, or multiple items, of input data provided to a trained model—such as a generally natural language model.

In some implementations, the system can further update (e.g., fine-tune) the trained machine learning model with one or more additional prompt files for a particular query domain. To fine tune, the system can generate one or more prompt files for the query domain. Each of the one or more prompt files includes one or more pairs of example queries corresponding to the query domain. The system can provide one or more prompt files to the machine learning model for fine-tuning parameters in the machine learning model. More specifically, the system can further update network parameters in the machine learning model when processing the one or more additional prompt files and the user query. Alternatively, the system can fine tune parameters with different user queries and their respective prompt files, so that the system slightly updates network parameters when processing a new user input and a corresponding prompt file in the corresponding query domain.

Figure 16:
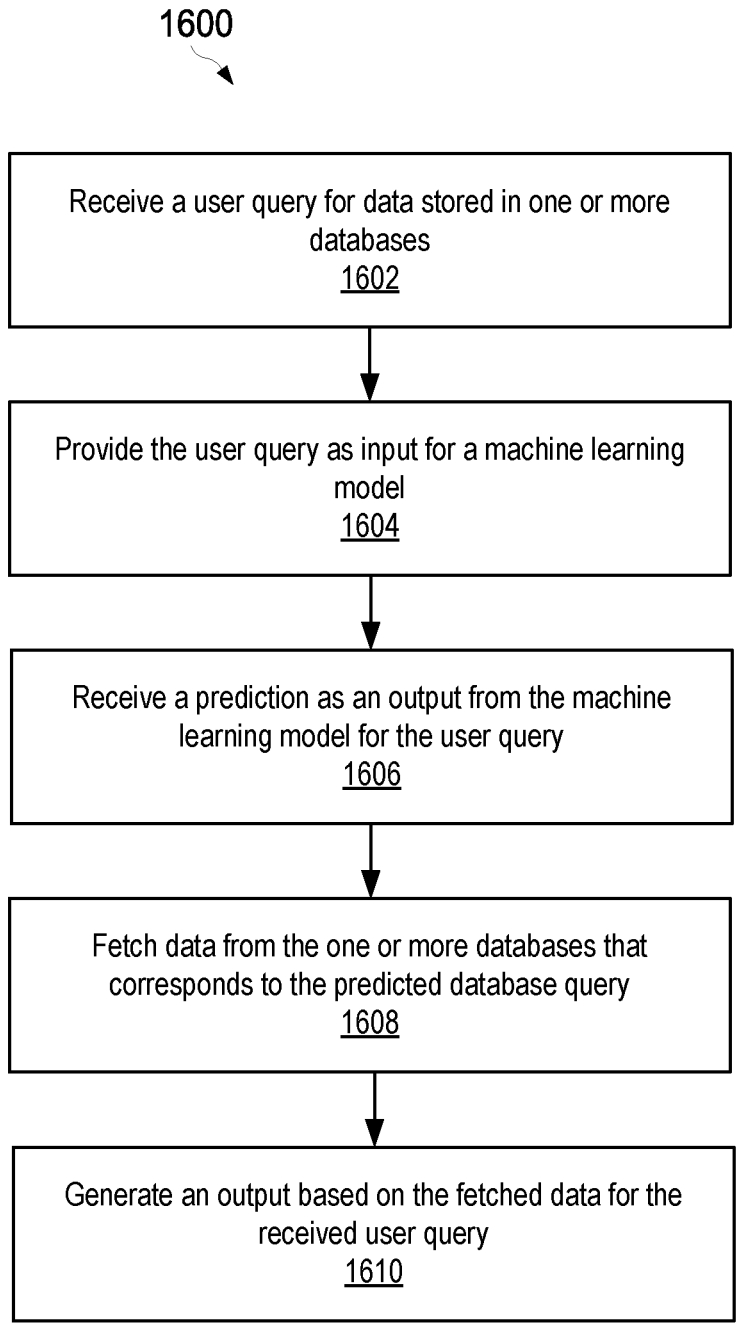
FIG. 16 is a flow diagram of an example process for performing inference operations of a trained machine learning model.

FIG. 16 is a flow diagram of an example process 1600 for performing inference operations of a trained machine learning model. The process 1600 can be performed by a system of one or more computers located in one or more locations. For example, in some implementations, the query processing system 1300 of FIG. 13, appropriately programmed, can perform the process 1600.

In the process 1600, for performing inference operations of a trained machine learning model for providing data corresponding to a user query, the system receives a user query for data stored in one or more databases (1602). As described above, the user query is represented in a first natural language. In some implementations, the system can determine that the user query is composed or represented in a natural language (e.g., English) that is different from another natural language (e.g., Chinese) that the machine learning model is trained upon. In response, the system can convert, using a generative language model, the user query to be represented by the other natural language that is compatible with the trained machine learning model.

The system provides the user query as input for a machine learning model (1604). In some implementations, the machine learning model has been trained by processing at least one prompt file determined for a particular domain of the database. For example, the model can be trained using a prompt file—e.g., as shown in FIG. 14. In some implementations, the model is trained as a language model—e.g., generative language model. For example, the prompt file can be used as additional prompt data—e.g., in addition to a user query—to inform output of the trained model. The prompt file can be generated based on a query domain determined for a user query. More specifically, the system can generate, for each of the plurality of domains, a respective domain feature vector for the domain, generate a query feature vector for the user query, and select a domain from the plurality of domains based on the respective domain feature vectors and the query feature vector. The selection can be based on a level of similarity between a domain feature vector for a particular domain and the query feature vector.

The prompt file can include one or more pairs of example queries. As described above, each example query pair can include a respective first query represented in a natural language, and a respective additional query or queries represented in a database language. The machine learning model can be external to the system, for example, the machine learning model can be trained or deployed on a third-party platform.

The system receives the prediction as an output from the machine learning model for the user query (1606). As described above, the prediction can include a predicted database query represented in the database language corresponding to the user query.

The system fetches data from the one or more databases that corresponds to the predicted database query (1608), and generates an output based on the fetched data for the received user query (1610). In some implementations, the system can convert, using a generative language model, the fetched data to be represented in the same natural language as the user query. Alternatively, the system can convert the fetched data to be represented in the natural language that is compatible for the trained machine learning model (e.g., the natural language in which the training examples are represented).

As described above and in connection with FIGS. 10, 11, 12A-D, the system can receive user input (e.g., a user query) from a user input interface (e.g., a message composition interface 1000 of FIG. 10). The user interface can be a virtual interface projected on a surface proximate to a wearable multimedia device. The system can present an output from the machine learning model corresponding to the user query on a user output interface (e.g., the composition UI element 1102 of FIG. 12B). The user output interface can also be a virtual interface projected on a surface proximate to a wearable multimedia device. Detail examples of a virtual interface are described above in connection with FIG. 10.

The term "machine learning model" as used throughout the specification can be neural network models suitable for the tasks described in this specification. Depending on the task, a neural network can be configured, i.e., through training, to receive any kind of digital data input and to generate any kind of score, classification, or regression output based on the input.

In addition to the embodiments described above, the following embodiments are also innovative:

Embodiment 1 is a method for using a machine learning model to provide data corresponding to a user query, the method comprising: receiving a user query for data stored in one or more databases, wherein the user query is represented in a first natural language; determining a prompt file for the user query, wherein the prompt file comprises one or more pairs of example queries, wherein an example query pair comprises a first query represented in the first natural language, and a respective second query represented in a database language; providing the prompt file and the user query as input for training or using a pre-trained machine learning model, wherein the machine learning model is configured to generate a prediction for the user query, wherein training the machine learning model comprises updating network parameters in the machine learning model based on the one or more pairs of example queries in the prompt file; receiving the prediction generated for the user query, wherein the prediction comprises a predicted database query represented in the database language corresponding to the user query; determining whether the predicted database query, based on a ground-truth database query for the user query, satisfies a level of accuracy.

Embodiment 2 is the method of Embodiment 1, wherein determining the prompt file for the user query comprising: determining a plurality of domains for the one or more databases; and selecting, as a query domain, a domain from the plurality of domains for generating the prompt file for the user query.

Embodiment 3 is the method of Embodiment 2, wherein the method further comprises: in response to determining that the predicted database query does not satisfy the level of accuracy, updating the prompt file by generating an additional example query pair for the query domain, wherein the additional example query pair comprises a new first query represented in the first natural language, and a new second query represented in the database language, wherein at least one of the new first query or the new second query is different from the respective first queries and the respective second queries in the one or more pairs of example queries; and providing the updated prompt file and the user query for the machine learning model.

Embodiment 4 is the method of any one of Embodiments 1-3, wherein the method further comprises: in response to determining that the predicted database query satisfies the level of accuracy, receiving a second user query for data stored in the one or more databases, wherein the second user query is represented in the first natural language; providing the second user query to the machine learning model for generating a prediction for the second user query; receiving the prediction generated for the second user query, wherein the prediction comprises a predicted database query represented in the database language corresponding to the second user query; fetching data from the one or more databases that corresponds to the predicted database query; and generating an output for the second user query based on the fetched data.

Embodiment 5 is the method of any one of Embodiments 2-4, wherein providing the prompt file and the user query to the machine learning model comprises: generating one or more additional prompt files for the query domain, each of the one or more additional prompt files comprising one or more pairs of example queries corresponding to the query domain; and providing the one or more additional prompt files to the machine learning model for updating the machine learning model, wherein updating the machine learning model comprises: further updating network parameters in the machine learning model when processing, using the machine learning model, the one or more additional prompt files and the user query.

Embodiment 6 is the method of any one of Embodiments 1-5, wherein using the machine learning model to provide data corresponding to the user query comprises using the machine learning model to provide data for presentation using a virtual interface corresponding to a wearable multimedia device.

Embodiment 7 is a method for providing data corresponding to a user query, the method comprising: receiving a user query for data stored in one or more databases, wherein the user query is represented in a first natural language; providing the user query as input for a machine learning model that has been trained by processing at least one prompt file determined for a particular domain of the one or more databases, wherein the prompt file comprises one or more pairs of example queries, each example query comprising a respective first query represented in the first natural language, and a respective second query represented in a database language; receiving a prediction for the user query as an output from the machine learning model, wherein the prediction comprises a predicted database query represented in the database language corresponding to the user query; fetching data from the one or more databases that corresponds to the predicted database query; and generating an output based on the fetched data for the received user query.

Embodiment 8 is the method of Embodiment 7, wherein after receiving a user query, the method further comprises: receiving a second user query for data stored in the one or more databases, wherein the second user query is represented in a second natural language; determining the second natural language of the second user query is different from the first natural language; and in response to the determination, converting the second user query to be represented in the first natural language.

Embodiment 9 is the method of Embodiment 7 or 8, wherein determining the prompt file for the user query comprises: determining a plurality of domains for the one or more databases; and selecting, as a query domain, a domain from the plurality of domains for generating the prompt file for the user query, wherein the particular domain of the one or more databases for training the machine learning model is the query domain.

Embodiment 10 is the method of Embodiment 9, wherein selecting the domain as the query domain comprises: for each of the plurality of domains, generating a respective domain feature vector for the domain; generating a query feature vector for the user query; and selecting a domain from the plurality of domains based on the respective domain feature vectors and the query feature vector.

Embodiment 11 is the method of any one of Embodiments 7-10, wherein generating the output based on the fetched data for the received user query comprises: converting, using a generative language model, the fetched data to be represented in the first natural language.

Embodiment 12 is the method of any one of Embodiments 8-11, wherein generating the output based on the fetched data for the received second user query comprises: converting the fetched data to be represented in the second natural language.

Embodiment 13 is the method of any one of Embodiments 7-12, wherein receiving the user query comprises receiving the user query using an input interface corresponding to a wearable multimedia device, and wherein generating the output for the received user query comprises presenting the output for the received user query using an output interface corresponding to the wearable multimedia device.

Embodiment 14 is the method of Embodiment 13, wherein the presenting the output for the received user query using the output interface corresponding to the wearable multimedia device comprises presenting the output for the received user query using a virtual interface corresponding to the wearable multimedia device, the virtual interface projected on a surface proximate to the wearable multimedia device.

Embodiment 15 is a system comprising one or more computers and one or more storage devices storing instructions that, when executed by the one or more computers, cause the one or more computers to perform operations of the method of any one of Embodiments 1-6.

Embodiment 16 is a system comprising one or more computers and one or more storage devices storing instructions that, when executed by the one or more computers, cause the one or more computers to perform operations of the method of any one of Embodiments 7-14.

Embodiment 17 is one or more computer storage media storing instructions that, when executed by one or more computers, cause the one or more computers to perform operations of the method of any one of Embodiments 1-6.

Embodiment 18 is one or more computer storage media storing instructions that, when executed by one or more computers, cause the one or more computers to perform operations of the method of any one of Embodiments 7-14.

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor. Method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random-access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits). To provide for interaction with a user the features may be implemented on a computer having a display device such as a CRT (cathode ray tube), LED (light emitting diode) or LCD (liquid crystal display) display or monitor for displaying information to the author, a keyboard and a pointing device, such as a mouse or a trackball by which the author may provide input to the computer.

One or more features or steps of the disclosed embodiments may be implemented using an Application Programming Interface (API). An API may define one or more parameters that are passed between a calling application and other software code (e.g., an operating system, library routine, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

A number of implementations have been described. Nevertheless, it will be understood that various modifications may be made. Elements of one or more implementations may be combined, deleted, modified, or supplemented to form further implementations. In yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method for using a machine learning model to provide data corresponding to a user query, the method comprising:
    receiving a user query for data stored in one or more databases, wherein the user query is represented in a first natural language;
    determining a prompt file for the user query, wherein the prompt file comprises one or more pairs of example queries, wherein an example query pair comprises a first query represented in the first natural language, and a respective second query represented in a database language;
    providing the prompt file and the user query as input for a machine learning model, wherein the machine learning model is configured to generate a prediction for the prompt file and the user query;
    receiving the prediction generated for the prompt file and the user query, wherein the prediction comprises a predicted database query represented in the database language corresponding to the user query;
    determining whether the predicted database query, based on a ground-truth database query for the user query, satisfies a level of accuracy; and
    providing, using (i) the machine learning model and (ii) a virtual interface corresponding to a wearable multimedia device, data corresponding to one or more user queries.

2. The method of claim 1, wherein determining the prompt file for the user query comprises:
    determining a plurality of domains for the one or more databases; and
    selecting, as a query domain, a domain from the plurality of domains for generating the prompt file for the user query.

3. The method of claim 2, wherein the method further comprises:
    in response to determining that the predicted database query does not satisfy the level of accuracy, updating the prompt file by generating an additional example query pair for the query domain, wherein the additional example query pair comprises a new first query represented in the first natural language, and a new second query represented in the database language, wherein at least one of the new first query or the new second query is different from the respective first queries and the respective second queries in the one or more pairs of example queries; and
    providing the updated prompt file and the user query as input for the machine learning model.

4. The method of claim 1, wherein the method further comprises:
    in response to determining that the predicted database query satisfies the level of accuracy, receiving a second user query for data stored in the one or more databases, wherein the second user query is represented in the first natural language;
    providing the second user query to the machine learning model for generating a prediction for the second user query;

receiving the prediction generated for the second user query, wherein the prediction comprises a second predicted database query represented in the database language corresponding to the second user query; and fetching data from the one or more databases that corresponds to the second predicted database query, wherein providing the data corresponding to the one or more user queries comprises generating an output for the second user query based on the fetched data.

5. The method of claim 2, wherein providing the prompt file and the user query to the machine learning model comprises:

generating one or more additional prompt files for the query domain, each of the one or more additional prompt files comprising one or more pairs of example queries corresponding to the query domain; and providing the one or more additional prompt files and the user query to the machine learning model.

6. The method of claim 1, wherein providing the data corresponding to the one or more user queries using the virtual interface corresponding to the wearable multimedia device comprises projecting light on a surface proximate to the wearable multimedia device.

7. The method of claim 1, comprising:

providing the prompt file and the user query as input for training the machine learning model, wherein training the machine learning model comprises updating network parameters in the machine learning model based on the one or more pairs of example queries in the prompt file.

8. A method for providing data corresponding to a user query, the method comprising:

receiving, using a wearable multimedia device, a user query for data stored in one or more databases, wherein the user query is represented in a first natural language;

providing the user query as input for a machine learning model that has been trained by processing at least one prompt file determined for a particular domain of the one or more databases, wherein the prompt file comprises one or more pairs of example queries, each example query comprising a respective first query represented in the first natural language, and a respective second query represented in a database language;

receiving a prediction for the user query as an output from the machine learning model, wherein the prediction comprises a predicted database query represented in the database language corresponding to the user query;

fetching data from the one or more databases that corresponds to the predicted database query; and generating, using a virtual interface corresponding to the wearable multimedia device, an output based on the fetched data for the received user query.

9. The method of claim 8, wherein after receiving the user query, the method further comprises:

receiving a second user query for data stored in the one or more databases, wherein the second user query is represented in a second natural language;

determining the second natural language of the second user query is different from the first natural language; and in response to the determination, converting the second user query to be represented in the first natural language.

10. The method of claim 8, wherein determining the prompt file for the user query comprises:

determining a plurality of domains for the one or more databases; and selecting, as a query domain, a domain from the plurality of domains for generating the prompt file for the user query, wherein the particular domain of the one or more databases for training the machine learning model is the query domain.

11. The method of claim 10, wherein selecting the domain as the query domain comprises:

for each of the plurality of domains, generating a respective domain feature vector for the domain;

generating a query feature vector for the user query; and selecting a domain from the plurality of domains based on the respective domain feature vectors and the query feature vector.

12. The method of claim 8, wherein generating the output based on the fetched data for the received user query comprises:

converting, using a generative language model, the fetched data to be represented in the first natural language.

13. The method of claim 9, wherein generating the output based on the fetched data for the received second user query comprises:

converting the fetched data to be represented in the second natural language.

14. The method of claim 8, wherein receiving the user query comprises receiving audio input using a microphone of the wearable multimedia device.

15. The method of claim 8, wherein generating the output based on the fetched data using the virtual interface comprises projecting light on a surface proximate to the wearable multimedia device.

16. A system comprising one or more computers and one or more storage devices storing instructions that when executed by one or more computers cause the one or more computers to perform operations for providing data corresponding to a user query, wherein the operations comprise:

receiving a user query for data stored in one or more databases, wherein the user query is represented in a first natural language;

determining a prompt file for the user query, wherein the prompt file comprises one or more pairs of example queries, wherein an example query pair comprises a first query represented in the first natural language, and a respective second query represented in a database language;

providing the prompt file and the user query as input for a machine learning model, wherein the machine learning model is configured to generate a prediction for the prompt file and the user query;

receiving the prediction generated for the prompt file and the user query, wherein the prediction comprises a predicted database query represented in the database language corresponding to the user query;

determining whether the predicted database query, based on a ground-truth database query for the user query, satisfies a level of accuracy; and providing, using (i) the machine learning model and (ii) a virtual interface corresponding to a wearable multimedia device, data corresponding to one or more user queries.

17. The system of claim 16, wherein determining the prompt file for the user query comprising:

determining a plurality of domains for the one or more databases; and selecting, as a query domain, a domain from the plurality of domains for generating the prompt file for the user query.

18. The system of claim 17, wherein the operations further comprise:
  in response to determining that the predicted database query does not satisfy the level of accuracy, updating the prompt file by generating an additional example query pair for the query domain, wherein the additional example query pair comprises a new first query represented in the first natural language, and a new second query represented in the database language, wherein at least one of the new first query or the new second query is different from the respective first queries and the respective second queries in the one or more pairs of example queries; and
  providing the updated prompt file and the user query as input for the machine learning model.

19. The system of claim 16, wherein the operations further comprise:
  in response to determining that the predicted database query satisfies the level of accuracy, receiving a second user query for data stored in the one or more databases, wherein the second user query is represented in the first natural language;
  providing the second user query to the machine learning model for generating a prediction for the second user query;
  receiving the prediction generated for the second user query, wherein the prediction comprises a second predicted database query represented in the database language corresponding to the second user query; and
  fetching data from the one or more databases that corresponds to the second predicted database query,
  wherein providing the data corresponding to the one or more user queries comprises, generating an output for the second user query based on the fetched data.

20. The system of claim 17, wherein providing the prompt file and the user query to the machine learning model comprises:
  generating one or more additional prompt files for the query domain, each of the one or more additional prompt files comprising one or more pairs of example queries corresponding to the query domain; and
  providing the one or more additional prompt files and the user query to the machine learning model.

* * * * *